United States Patent
Nagano et al.

(10) Patent No.: US 10,415,827 B2
(45) Date of Patent: Sep. 17, 2019

(54) EXHAUST ADAPTER, EXHAUST STRUCTURE FOR WATER HEATER, AND METHOD FOR INSTALLING EXHAUST ADAPTER

(71) Applicant: NORITZ CORPORATION, Hyogo (JP)

(72) Inventors: Takanori Nagano, Kakogawa (JP); Koji Shimomura, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 15/406,300

(22) Filed: Jan. 13, 2017

(65) Prior Publication Data

US 2017/0130960 A1    May 11, 2017

Related U.S. Application Data

(62) Division of application No. 14/291,418, filed on May 30, 2014, now Pat. No. 9,989,252.

(Continued)

(51) Int. Cl.
*F23J 13/04* (2006.01)
*F16L 7/02* (2006.01)
(Continued)

(52) U.S. Cl.
CPC .............. *F23J 13/04* (2013.01); *F16L 7/02* (2013.01); *F23L 17/04* (2013.01); *F24H 9/16* (2013.01);
(Continued)

(58) Field of Classification Search
CPC ......... F24H 9/122; F16L 7/00; F23J 2211/101
See application file for complete search history.

(56) References Cited

U.S. PATENT DOCUMENTS 1,280,312 A * 10/1918 Scherer ................. F16L 21/002
                                                                   285/148.24
2,275,902 A *  3/1942 Hasenburger ............ F16L 7/00
                                                                   126/307 R
(Continued)

FOREIGN PATENT DOCUMENTS

FR        2803896 A1    7/2001
JP    2000-179750 A    6/2000
(Continued)

OTHER PUBLICATIONS

An Office Action issued by the U.S. Patent Office dated Mar. 9, 2017, which corresponds to U.S. Appl. No. 14/291,418 and is related to U.S. Appl. No. 15/406,300.

(Continued)

*Primary Examiner* — Avinash A Savani
*Assistant Examiner* — Martha M Becton
(74) *Attorney, Agent, or Firm* — Studebaker & Brackett PC

(57) ABSTRACT

An exhaust adapter secures an exhaust tube relative to an exhaust pipe. The exhaust adapter is formed to have an annular shape enclosing a through hole, and is mounted on the outer peripheral surface of the exhaust tube and on the inner peripheral surface of the exhaust pipe by inserting the exhaust tube into the through hole. When the exhaust adapter is being fitted on the outer peripheral surface of the exhaust tube, the inner peripheral surface of the exhaust adapter presses the outer peripheral surface of the exhaust tube, and when the exhaust adapter is being fitted on the inner peripheral surface of the exhaust pipe, the outer peripheral surface of the exhaust adapter presses the inner peripheral surface of the exhaust pipe.

4 Claims, 27 Drawing Sheets

Related U.S. Application Data

(60) Provisional application No. 61/868,972, filed on Aug. 22, 2013.

(51) Int. Cl.
  *F23L 17/04*   (2006.01)
  *F24H 9/16*   (2006.01)
  *F24H 9/18*   (2006.01)
  *F24H 8/00*   (2006.01)

(52) U.S. Cl.
  CPC ....... *F24H 9/1836* (2013.01); *F23J 2211/101* (2013.01); *F23J 2213/202* (2013.01); *F23J 2213/204* (2013.01); *F23J 2213/50* (2013.01); *F23J 2900/13005* (2013.01); *F24H 8/00* (2013.01); *Y02B 30/102* (2013.01); *Y10T 29/49826* (2015.01)

(56) References Cited

U.S. PATENT DOCUMENTS

| | | | | |
|---|---|---|---|---|
| 2,448,769 A * | 9/1948 | Chamberlain | ........ | F16L 21/005 16/108 |
| 2,510,926 A | 6/1950 | Goldstein | | |
| 2,868,230 A * | 1/1959 | Stokes | ........ | F16L 7/00 138/113 |
| 2,924,472 A * | 2/1960 | Bush | ........ | F16L 17/025 220/378 |
| 3,150,876 A * | 9/1964 | Lafferty | ........ | F16L 17/025 277/603 |
| 3,165,324 A * | 1/1965 | Zopfi | ........ | F16L 21/02 277/615 |
| 3,208,914 A | 9/1965 | Dickson | | |
| 3,266,821 A * | 8/1966 | Safford | ........ | F16L 15/001 285/110 |
| 3,306,109 A | 2/1967 | Caparone | | |
| 3,314,696 A * | 4/1967 | Ferguson | ........ | F16L 37/088 24/665 |
| 3,331,914 A * | 7/1967 | Kavinsky | ........ | H01B 17/306 174/667 |
| 3,352,212 A * | 11/1967 | Read | ........ | E21B 37/10 277/436 |
| 3,386,745 A * | 6/1968 | Hein | ........ | F16L 17/025 277/605 |
| 3,516,690 A * | 6/1970 | Kreig | ........ | F16L 13/0236 285/288.2 |
| 3,578,027 A * | 5/1971 | Zopfi | ........ | F16L 55/1141 138/89 |
| 3,580,988 A * | 5/1971 | Orlowski | ........ | H02G 3/0616 16/2.2 |
| 3,684,220 A * | 8/1972 | Logsdon | ........ | F16L 5/00 248/56 |
| 3,702,193 A * | 11/1972 | Flegel et al. | ........ | F16J 15/02 277/607 |
| 3,913,928 A * | 10/1975 | Yamaguchi | ........ | E03C 1/14 277/604 |
| 3,998,478 A * | 12/1976 | Zopfi | ........ | F16L 17/025 277/607 |
| 4,012,061 A * | 3/1977 | Olson | ........ | E21B 17/042 285/114 |
| 4,114,656 A * | 9/1978 | Kish | ........ | F16L 33/2071 138/109 |
| 4,115,961 A | 9/1978 | Bishop | | |
| 4,262,608 A * | 4/1981 | Jackson | ........ | F23J 13/025 110/162 |
| 4,329,540 A * | 5/1982 | Howarth | ........ | H01B 17/306 174/153 R |
| 4,338,888 A * | 7/1982 | Gerstmann | ........ | F23D 14/64 122/18.2 |
| 4,423,891 A * | 1/1984 | Menges | ........ | F16L 25/0045 285/305 |
| 4,426,095 A * | 1/1984 | Buttner | ........ | F16L 17/025 277/606 |
| 4,429,886 A * | 2/1984 | Buttner | ........ | F16L 41/088 277/606 |
| 4,434,784 A * | 3/1984 | Van Patten | ........ | A62C 3/04 126/200 |
| 4,438,728 A * | 3/1984 | Fracaro | ........ | F24H 1/18 122/18.2 |
| 4,445,464 A * | 5/1984 | Gerstmann | ........ | F24H 1/186 122/18.4 |
| 4,487,421 A * | 12/1984 | Housas | ........ | B29D 99/0053 277/616 |
| 4,549,525 A * | 10/1985 | Narang | ........ | F24H 1/207 122/14.21 |
| 4,664,096 A * | 5/1987 | Narang | ........ | F24H 1/207 122/14.21 |
| 4,664,421 A * | 5/1987 | Jones | ........ | F16L 17/025 277/615 |
| 4,768,444 A * | 9/1988 | DeWerth | ........ | F23J 11/02 110/160 |
| 4,773,390 A * | 9/1988 | Watts | ........ | F24H 1/107 122/28 |
| 4,778,203 A * | 10/1988 | Bartholomew | ........ | F16L 37/0987 285/111 |
| 4,793,451 A * | 12/1988 | Taylor | ........ | F16F 5/00 188/316 |
| 4,822,079 A * | 4/1989 | Schulte | ........ | B60S 1/48 16/2.2 |
| 4,844,274 A | 7/1989 | Sterk | | |
| 4,869,232 A * | 9/1989 | Narang | ........ | F24H 1/207 122/14.1 |
| 4,884,829 A * | 12/1989 | Funk | ........ | B60R 16/08 285/24 |
| 4,925,093 A * | 5/1990 | Moore, Jr. | ........ | F24H 1/206 122/14.22 |
| D309,774 S * | 8/1990 | Lewis | ........ | D23/262 |
| 4,948,176 A * | 8/1990 | Bartholomew | ........ | F16L 37/0982 285/319 |
| 4,998,896 A * | 3/1991 | Lundergan | ........ | H01R 13/4365 439/274 |
| 5,028,080 A * | 7/1991 | Dennany, Jr. | ........ | F16L 37/22 285/308 |
| 5,039,137 A * | 8/1991 | Cankovic | ........ | F16L 21/005 285/148.26 |
| 5,067,751 A * | 11/1991 | Walworth | ........ | F16L 21/03 285/105 |
| 5,098,241 A * | 3/1992 | Aldridge | ........ | A62C 37/09 285/321 |
| 5,133,579 A * | 7/1992 | Anderson | ........ | D06F 58/20 285/226 |
| 5,169,161 A * | 12/1992 | Jones | ........ | F16J 15/025 277/615 |
| 5,209,523 A * | 5/1993 | Godeau | ........ | F16L 37/144 285/305 |
| 5,219,189 A * | 6/1993 | Demoisson | ........ | F16L 37/0845 285/105 |
| 5,239,947 A * | 8/1993 | Schimmeyer | ........ | F23L 11/005 110/163 |
| 5,317,924 A * | 6/1994 | Maack | ........ | G01L 19/0007 220/691 |
| 5,390,967 A * | 2/1995 | Gooderham | ........ | F16L 25/00 285/148.24 |
| 5,568,947 A * | 10/1996 | Paquette | ........ | E04F 17/04 285/192 |
| 5,611,706 A * | 3/1997 | Makita | ........ | H01R 13/5205 439/275 |
| 5,649,712 A * | 7/1997 | Ekholm | ........ | F16L 21/02 277/607 |
| 5,697,330 A * | 12/1997 | Yetman | ........ | F24H 1/205 122/14.21 |
| 5,924,390 A * | 7/1999 | Bock | ........ | F23L 17/04 110/162 |
| 5,954,345 A * | 9/1999 | Svoboda | ........ | F16H 57/029 16/2.3 |
| 6,015,169 A * | 1/2000 | Funke | ........ | E03F 3/04 285/136.1 |
| 6,053,162 A * | 4/2000 | Godfree | ........ | F23L 17/04 126/293 |

(56) References Cited

U.S. PATENT DOCUMENTS

| | | | |
|---|---|---|---|
| 6,076,862 A | 6/2000 | Barth et al. | |
| 6,100,472 A * | 8/2000 | Foss | G02B 6/4428 174/77 R |
| 6,359,224 B1 * | 3/2002 | Beele | F16L 5/10 16/2.1 |
| 6,485,290 B2 * | 11/2002 | Long | F21L 19/00 285/309 |
| 6,612,623 B2 * | 9/2003 | Salomon-Bahls | F16L 37/0915 285/308 |
| 6,685,144 B1 | 2/2004 | Wochnick | |
| 6,776,125 B2 * | 8/2004 | Stretch | F23D 14/72 122/14.1 |
| 6,862,852 B1 * | 3/2005 | Beele | A62C 2/065 137/67 |
| 7,198,304 B2 * | 4/2007 | Angus | F16L 5/10 285/136.1 |
| 7,252,293 B2 * | 8/2007 | Happel | F16L 21/03 277/575 |
| 7,410,174 B2 * | 8/2008 | Jones | F16L 21/08 277/615 |
| 7,455,299 B2 * | 11/2008 | Mori | B60K 15/03 277/608 |
| 7,574,921 B2 * | 8/2009 | Fessele | G01L 19/0007 73/756 |
| 7,699,356 B2 * | 4/2010 | Bucher | F16L 37/088 285/244 |
| 7,762,559 B2 * | 7/2010 | Suzuki | F16J 15/104 277/627 |
| 7,837,234 B2 * | 11/2010 | Yoshino | F16L 37/0841 285/305 |
| 7,918,486 B2 * | 4/2011 | Preisendorfer | F16L 41/088 285/136.1 |
| 8,413,689 B1 * | 4/2013 | Taylor | F16L 55/11 138/89 |
| 8,490,580 B2 * | 7/2013 | Tanbour | F16J 3/041 122/13.01 |
| 8,556,300 B2 * | 10/2013 | Isenburg | F16L 21/06 174/59 |
| 8,596,226 B2 * | 12/2013 | McAnally | F23M 11/02 122/17.1 |
| 8,783,693 B2 * | 7/2014 | Beele | H02G 3/22 277/314 |
| 8,857,548 B2 * | 10/2014 | Yamamoto | F16L 3/23 138/106 |
| 8,984,822 B1 | 3/2015 | Cline et al. | |
| 9,004,543 B2 * | 4/2015 | Bongiorni | F16L 21/08 285/305 |
| 9,188,267 B2 * | 11/2015 | Fansler | F16L 37/088 |
| 9,360,140 B2 * | 6/2016 | Sasinowski | F16J 15/104 |
| D784,228 S * | 4/2017 | Nagano | D12/194 |
| D784,229 S * | 4/2017 | Nagano | D12/194 |
| 9,611,964 B2 * | 4/2017 | Nezu | F16L 37/088 |
| 2001/0002754 A1 * | 6/2001 | Dobler | F16L 37/088 285/321 |
| 2003/0196609 A1 * | 10/2003 | Stretch | F23D 14/72 122/17.1 |
| 2004/0045233 A1 * | 3/2004 | Beele | F16L 5/04 52/220.8 |
| 2006/0100374 A1 * | 5/2006 | Hamada | B32B 25/02 525/132 |
| 2007/0107793 A1 * | 5/2007 | Uehara | B05B 1/302 138/112 |
| 2007/0273107 A1 * | 11/2007 | Beele | F16L 5/10 277/607 |
| 2008/0088128 A1 * | 4/2008 | Staskal | E03C 1/122 285/230 |
| 2009/0008885 A1 * | 1/2009 | Kanagae | C08G 18/61 277/650 |
| 2009/0235875 A1 | 9/2009 | Gordon et al. | |
| 2009/0301406 A1 * | 12/2009 | Ritsema | F24H 1/205 122/13.01 |
| 2009/0302603 A1 * | 12/2009 | Clayton | F23K 5/007 285/382 |
| 2010/0000513 A1 * | 1/2010 | LaMunyon, III | F23J 13/00 126/312 |
| 2010/0044970 A1 * | 2/2010 | Suzuki | F16J 15/061 277/592 |
| 2010/0164176 A1 * | 7/2010 | Beele | F16L 5/04 277/314 |
| 2010/0269943 A1 | 10/2010 | Arai | |
| 2011/0074149 A1 | 3/2011 | Matsui et al. | |
| 2011/0240143 A1 | 10/2011 | Lang et al. | |
| 2012/0272928 A1 | 11/2012 | Kameyama | |
| 2012/0298242 A1 * | 11/2012 | Casella | F16L 33/2073 138/103 |
| 2012/0323221 A1 | 12/2012 | Gallo et al. | |
| 2013/0106060 A1 * | 5/2013 | Beele | F16L 5/10 277/314 |
| 2013/0234405 A1 * | 9/2013 | Beele | F16L 5/10 277/606 |
| 2015/0056903 A1 | 2/2015 | Nagano et al. | |
| 2015/0219000 A1 | 8/2015 | Nojiri | |
| 2015/0292649 A1 * | 10/2015 | Beele | F16L 5/10 277/606 |
| 2016/0068039 A1 | 3/2016 | Yamada | |

FOREIGN PATENT DOCUMENTS

| | | |
|---|---|---|
| JP | 2006-349327 A | 12/2006 |
| JP | 2009-281057 A | 12/2009 |
| JP | 2014-218163 A | 11/2014 |

OTHER PUBLICATIONS

An Office Action issued by the U.S. Patent Office dated Aug. 17, 2015, which corresponds to Design U.S. Appl. No. 29/492,341 and is related to the present application.

Office Action issued by the U.S. Patent and Trademark Office dated Jun. 12, 2018, which corresponds to U.S. Appl. No. 14/925,567 and is related to U.S. Appl. No. 15/406,300.

Office Action issued by the U.S. Patent and Trademark Office dated Jan. 18, 2019, which corresponds to U.S. Appl. No. 14/925,567 and is related to U.S. Appl. No. 15/406,300.

* cited by examiner

FIG.29
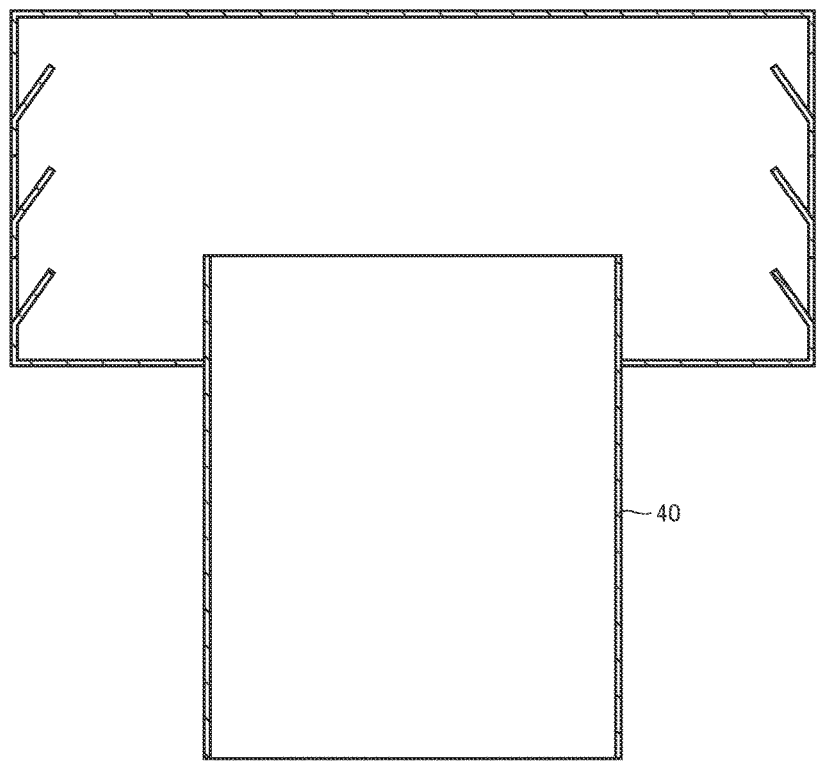
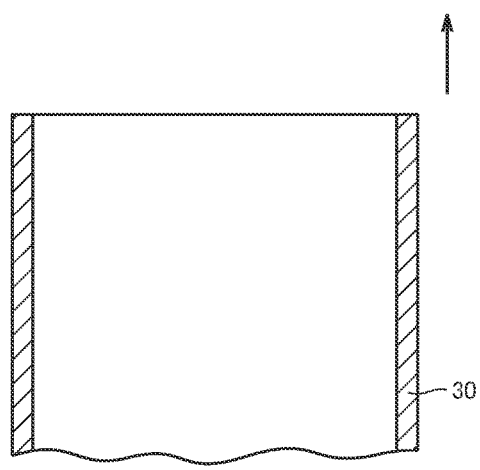

EXHAUST ADAPTER, EXHAUST STRUCTURE FOR WATER HEATER, AND METHOD FOR INSTALLING EXHAUST ADAPTER

BACKGROUND OF THE INVENTION

Field of the Invention

The present invention relates to an exhaust adapter, an exhaust structure for water heater, and a method for installing exhaust adapter.

Description of the Background Art

Nowadays, among water heaters being sold in the United States market, a tank water heater is popular. Generally, the tank water heater is installed, for example, inside a boiler room. The exhaust gas generated from combustion in the tank water heater is generally discharged outside the roof of a residential house through an exhaust pipe. Upon replacing the tank water heater with an instantaneous water heater, all of the installed exhaust members, including for example the exhaust pipe which has been installed, in the residential house will also be replaced.

However, such replacement will make the installation complex and increase the installation cost. In addition, in some regions, the decision of performing such replacement cannot be made personally since the replacement involving changes on the outer appearance of a residential house requires the community approval.

Moreover, unlike the tank water heater, the instantaneous water heater is equipped with a fan motor. The exhaust gas is forcibly discharged according to a blowing pressure from the fan motor. Therefore, in the case where the exhaust gas is to be discharged through an existing exhaust pipe, if the exhaust pipe has a joint point or more, the exhaust gas may leak from the joint point.

SUMMARY OF THE INVENTION

The present invention has been accomplished in view of the aforementioned problems, and it is therefore an object of the present invention to provide an exhaust adapter, an exhaust structure for water heater and a method for installing exhaust adapter, allowing the replacement of the water heater to be performed easily and cheaply without involving changes on the outer appearance of a residential house.

The exhaust adapter according to one aspect of the present invention is formed to have an annular shape enclosing a through hole and is configured to be supported by an exhaust pipe at an outer peripheral side of the annular shape and to support an exhaust tube at an inner peripheral side thereof. The exhaust adapter according to the present invention includes an annular member and an outer peripheral projection member. The annular member includes one end surface and the other end surface facing each other, and includes the through hole penetrating across the one end surface and the other end surface. The outer peripheral projection member has an annular shape and projects from an outer peripheral surface of the annular member outward circumferentially.

According to the exhaust adapter of one aspect of the present invention, the outer peripheral projection member projects from an outer peripheral surface of the annular member outward circumferentially. Therefore, it is possible to fit the exhaust adapter on the inner peripheral surface of the exhaust pipe so that the outer peripheral surface of the exhaust adapter presses the inner peripheral surface of the exhaust pipe, and on the outer peripheral surface of the exhaust tube so that the inner peripheral surface of the exhaust adapter presses the outer peripheral surface of the exhaust tube. Thus, it is possible to fix a replacement exhaust tube relative to an existing exhaust pipe, allowing the replacement of the water heater to be performed easily and cheaply without involving changes on the appearance of a residential house.

Further, according to the exhaust adapter of one aspect of the present invention, it is possible to prevent exhaust gas discharged by the exhaust tube from leaking into a space between the exhaust tube and the exhaust pipe, and it is also possible to prevent the rain water or the like entered the exhaust pipe from entering the space between the exhaust tube and the exhaust pipe.

In the exhaust adapter of one aspect of the present invention as described above, the outer peripheral projection member includes a plurality of projections having an annular shape and projecting from an outer peripheral surface of the annular member outward circumferentially. Each of the plurality of projections is provided on the outer peripheral surface of the annular member at any position except an edge portion on the side of the one end surface and an edge portion on the side of the other end surface. Since the outer peripheral projection member includes a plurality of projections and each of the plurality of projections presses the inner peripheral surface of the exhaust pipe, it is possible for the exhaust adapter to further prevent the exhaust gas from leaking out from a joint point. Further, since the outer peripheral projection member is divided into a plurality of projections, upon inserting the exhaust adapter into the exhaust pipe, it is possible to reduce the resistance between each projection and the inner peripheral surface of the exhaust pipe, allowing a smooth insertion of the exhaust adapter into the exhaust pipe. Furthermore, each of the plurality of projections is provided on the outer peripheral surface of the annular member at any position except an edge portion on the side of the one end surface and an edge portion on the side of the other end surface. Thus, it is possible to make the annular member contact the outer peripheral surface of the exhaust tube closer at the edge portion on the side of the one end surface or the other end surface than at the projections. Thereby, when the exhaust adapter which has been fitted on the outer peripheral surface of the exhaust tube is being inserted into the exhaust pipe from the side of the one end surface, even though the projections scrape against the inner peripheral surface of the exhaust pipe, the edge portion on the side of the one end surface of the exhaust adapter can be prevented from being torn away from the exhaust tube.

The exhaust adapter of one aspect of the present invention as described above further includes an inner peripheral projection member having an annular shape and projecting from an inner peripheral surface of the annular member inward circumferentially. By fitting the inner peripheral projection into a recess provided on the outer peripheral surface of the exhaust tube, it is possible to fix the exhaust adapter firmly on the outer peripheral surface of the exhaust tube.

In the exhaust adapter of one aspect of the present invention as described above, the inner peripheral projection member is disposed at either an edge portion on the side of the one end surface or an edge portion on the side of the other end surface. Thus, in the case where a recess is provided on the outer peripheral surface of the exhaust tube, it is possible to fit the inner peripheral projection of the exhaust adapter into the recess. Thereby, when the exhaust adapter which has been fitted on the outer peripheral surface of the exhaust tube is being inserted into the exhaust pipe, even though the projections scrape against the inner peripheral surface of the exhaust pipe, the edge portion on the side of the one end surface or the edge portion on the side of the other end surface of the exhaust adapter can be prevented from being torn away from the exhaust tube. On the contrary, in the case where the inner peripheral projection member is disposed at a position distant from the edge portion on the side of one end surface toward the other end surface of the exhaust adapter, the water or the like may accumulate in a space formed between the edge portion on the side of one end surface and the inner peripheral projection member. However, according to the exhaust adapter described above, since the inner peripheral projection member is disposed at either an edge portion on the side of the one end surface or an edge portion on the side of the other end surface, such space is prevented from being formed therebetween, and consequently, the water or the like is prevented from being accumulated in the space.

In the exhaust adapter of one aspect of the present invention as described above, the outer peripheral projection member is configured to have a decreasing width as it extends toward an outer peripheral end thereof. Thus, upon inserting the exhaust adapter into the exhaust pipe, it is possible to reduce the resistance between the outer peripheral projection member and the inner peripheral surface of the exhaust pipe, allowing a smooth insertion of the exhaust adapter into the exhaust pipe.

The exhaust adapter of one aspect of the present invention as described above further includes an abutting projection member disposed on the outer peripheral surface of the annular member closer to the one end surface than the outer peripheral projection member and projecting outward circumferentially from the annular member greater than the outer peripheral projection member for abutting against an upper end of the exhaust pipe. Thus, upon fitting the exhaust adapter on the exhaust tube and the exhaust pipe, since the abutting projection member abuts against the upper end of the exhaust pipe, the exhaust adapter is allowed to be positioned at the upper end of the exhaust pipe. Even after the assembly, the abutting projection member can hold the exhaust adapter in the exhaust pipe without falling out as well as protect the upper end surface of the exhaust pipe.

An exhaust adapter according to another aspect of the present invention is formed to have an annular shape enclosing a through hole and is configured to be supported by an exhaust pipe at an outer peripheral side of the annular shape and to support an exhaust tube at an inner peripheral side thereof. The exhaust adapter according to the present invention includes a first annular member, a second annular member and a third annular member. The first annular member is located innermost the annular shape. The second annular member is located outermost the annular shape. The third annular member is located between the first annular member and the second annular member and has a hardness higher than any of the first annular member and the second annular member.

According to the exhaust adapter of another aspect of the present invention, the first annular member located innermost the annular shape and the second annular member located outermost the annular shape are configured to have a lower hardness than the third annular member. Therefore, it is possible to fit the exhaust adapter on the inner peripheral surface of the exhaust pipe so that the outer peripheral surface of the exhaust adapter presses the inner peripheral surface of the exhaust pipe and on the outer peripheral surface of the exhaust tube so that the inner peripheral surface of the exhaust adapter presses the outer peripheral surface of the exhaust tube. Thus, it is possible to fix a replacement exhaust tube relative to an existing exhaust pipe, allowing the replacement of the water heater to be performed easily and cheaply without involving changes on the appearance of a residential house.

In the exhaust adapter of another aspect of the present invention as described above, each of the first annular member, the second annular member and the third annular member is made of resin. Thus, it is possible to mount the first annular member and the second annular member on the inner peripheral surface and the outer peripheral surface of the third annular member, respectively, and also it is possible to manufacture the exhaust adapter as a resin molding of a three-layer structure.

An exhaust structure for water heater according to the present invention includes a water heater, an exhaust tube, an exhaust pipe, and an exhaust adapter. The exhaust tube has one end and the other end, and is connected to the water heater at the one end. A part of the exhaust tube at the other end thereof is inserted into the exhaust pipe. The exhaust adapter is formed to have an annular shape enclosing a through hole, and is mounted on an outer peripheral surface of the exhaust tube by inserting the exhaust tube into the through hole and is mounted on an inner peripheral surface of the exhaust pipe. When the exhaust adapter is being fitted on the outer peripheral surface of the exhaust tube, an inner peripheral surface of the exhaust adapter presses the outer peripheral surface of the exhaust tube, and when the exhaust adapter is being fitted on the inner peripheral surface of the exhaust pipe, an outer peripheral surface of the exhaust adapter presses the inner peripheral surface of the exhaust pipe.

According to the exhaust structure for water heater of the present invention, it is possible to fit the exhaust adapter on the inner peripheral surface of the exhaust pipe so that the outer peripheral surface of the exhaust adapter presses the inner peripheral surface of the exhaust pipe and fit the exhaust adapter on the outer peripheral surface of the exhaust tube so that the inner peripheral surface of the exhaust adapter presses the outer peripheral surface of the exhaust tube. Thus, it is possible to fix a replacement exhaust tube relative to an existing exhaust pipe, allowing the replacement of the water heater to be performed easily and cheaply without involving changes on the appearance of a residential house. In addition, it is possible to discharge the exhaust gas generated by the water heater to the outside through the exhaust tube (without causing any problems such as the leakage of exhaust gas) regardless of the conditions of the existing exhaust pipe.

In the exhaust structure for water heater as described above, the exhaust adapter includes an annular member and an annular outer peripheral projection member. The annular member includes one end surface and the other end surface facing each other and includes the through hole penetrating across the one end surface and the other end surface, and is mounted on the exhaust tube in such a way that the one end surface is positioned closer to the other end of the exhaust tube than the other end surface. The outer peripheral projection member has an annular shape and projects from an outer peripheral surface of the annular member outward circumferentially, pressing the inner peripheral surface of the exhaust pipe. Thus, it is possible to fit the exhaust adapter on the inner peripheral surface of the exhaust pipe so that the outer peripheral projection member of the exhaust adapter presses the inner peripheral surface of the exhaust pipe.

In the exhaust structure for water heater as described above, the outer peripheral projection member includes a plurality of projections having an annular shape and projecting from an outer peripheral surface of the annular member outward circumferentially. Each of the plurality of projections is provided on the outer peripheral surface of the annular member at any position except an edge portion on the side of the one end surface and an edge portion on the side of the other end surface. Since the outer peripheral projection member includes a plurality of projections and each of the plurality of projections presses the inner peripheral surface of the exhaust pipe, it is possible for the exhaust adapter to further prevent the exhaust gas from leaking out from a joint point. Further, since the outer peripheral projection member is divided into a plurality of projections, upon inserting the exhaust adapter into the exhaust pipe, it is possible to reduce the resistance between each projection and the inner peripheral surface of the exhaust pipe, allowing a smooth insertion of the exhaust adapter into the exhaust pipe. Furthermore, each of the plurality of projections is provided on the outer peripheral surface of the annular member at any position except an edge portion on the side of the one end surface and an edge portion on the side of the other end surface. Thus, it is possible to make the annular member contact the outer peripheral surface of the exhaust tube closer at the edge portion on the side of the one end surface or the other end surface than at the projections. Thereby, when the exhaust adapter which has been fitted on the outer peripheral surface of the exhaust tube is inserted into the exhaust pipe from the side of the one end surface, even though the projections scrape against the inner peripheral surface of the exhaust pipe, the edge portion on the side of the one end surface of the exhaust adapter can be prevented from being torn away from the exhaust tube.

In the exhaust structure for water heater as described above, the exhaust tube is provided with a recess on the outer peripheral surface. The exhaust adapter further includes an inner peripheral projection member having an annular shape and projecting from an inner peripheral surface of the annular member inward circumferentially so as to fit into the recess of the exhaust tube. By fitting the inner peripheral projection into the recess provided on the outer peripheral surface of the exhaust tube, it is possible to fix the exhaust adapter firmly on the outer peripheral surface of the exhaust tube.

In the exhaust structure for water heater as described above, the inner peripheral projection member is disposed at either an edge portion on the side of the one end surface or an edge portion on the side of the other end surface. Thereby, when the exhaust adapter which has been fitted on the outer peripheral surface of the exhaust tube is inserted into the exhaust pipe, even though the projections scrape against the inner peripheral surface of the exhaust pipe, the edge portion on the side of the one end surface of the exhaust adapter can be prevented from being torn away from the exhaust tube. On the contrary, in the case where the inner peripheral projection member is disposed at any position distant from the edge portion on the side of one end surface toward the other end surface of the exhaust adapter, the water or the like may accumulate in a space formed between the edge portion on the side of one end surface and the inner peripheral projection member. However, according to the exhaust adapter described above, since the inner peripheral projection member is disposed at either an edge portion on the side of the one end surface or an edge portion on the side of the other end surface, such space is prevented from being formed therebetween, and consequently, the water or the like is prevented from being accumulated in the space.

In the exhaust structure for water heater as described above, the exhaust adapter further includes an abutting projection member disposed on the outer peripheral surface of the annular member closer to the one end surface than the outer peripheral projection member and projecting outward circumferentially from the annular member greater than the outer peripheral projection member for abutting against an upper end of the exhaust pipe. Upon fitting the exhaust adapter on the exhaust tube and the exhaust pipe, the abutting projection member abuts against the upper end of the exhaust pipe, allowing the exhaust adapter to be positioned at the upper end of the exhaust pipe. Even after the assembly, the abutting projection member can hold the exhaust adapter in the exhaust pipe without falling out as well as protect the upper end surface of the exhaust pipe.

In the exhaust structure for water heater as described above, the exhaust adapter includes a first annular member, a second annular member and a third annular member. The first annular member is located innermost the annular shape. The second annular member is located outermost the annular shape. The third annular member is located between the first annular member and the second annular member and has a hardness higher than any of the first annular member and the second annular member.

Therefore, the first annular member located innermost the annular shape and the second annular member located outermost the annular shape have a lower hardness than the third annular member. Thus, it is possible to fit the exhaust adapter on the inner peripheral surface of the exhaust pipe so that the outer peripheral surface of the exhaust adapter presses the inner peripheral surface of the exhaust pipe and on the outer peripheral surface of the exhaust tube so that the inner peripheral surface of the exhaust adapter presses the outer peripheral surface of the exhaust tube.

In the exhaust structure for water heater as described above, the inner peripheral surface of the exhaust adapter includes a portion of an accordion shape. Thus, in the case where the outer peripheral surface of the exhaust tube to be inserted into the through hole of the exhaust adapter has an accordion shape, it is possible to match the accordion shape of the inner peripheral surface of the exhaust adapter with the accordion shape of the exhaust tube. Therefore, it is possible to make the inner peripheral surface of the exhaust adapter contact closely the outer peripheral surface of the exhaust tube.

In the exhaust structure for water heater as described above, the inner peripheral surface of the exhaust adapter includes a portion of a spiral groove shape. Thus, in the case where the outer peripheral surface of the exhaust tube to be inserted into the through hole of the exhaust adapter has a spiral groove shape, it is possible to match the spiral groove shape of the inner peripheral surface of the exhaust adapter with the spiral groove shape of the exhaust tube. Therefore, it is possible to make the inner peripheral surface of the exhaust adapter contact closely the outer peripheral surface of the exhaust tube.

In the exhaust structure for water heater as described above, the outer peripheral surface of the exhaust adapter has a tapered shape with the outer diameter of the exhaust adapter decreasing from one end toward the other end thereof. Thus, it is possible to easily insert the exhaust adapter into the exhaust pipe by inserting the exhaust adapter from the side having a smaller outer diameter.

Moreover, as the exhaust adapter is inserted into the exhaust pipe, the portion of the exhaust adapter having a greater outer diameter will be supported by the exhaust pipe, and thereby, the exhaust adapter can be firmly supported inside the exhaust pipe.

The exhaust structure for water heater as described above further includes a positioning member mounted on the inner peripheral surface of the exhaust pipe. The exhaust adapter is positioned relative to the exhaust pipe by the positioning member. Thus, upon inserting the exhaust adapter into the exhaust pipe, it is possible to easily position the exhaust adapter relative to the exhaust pipe through the positioning member.

In the exhaust structure for water heater as described above, the water heater is a condensing type water heater, and one surface of the exhaust adapter includes an inclined face with a descending slope in the direction from the outer periphery toward the inner periphery. Thus, it is possible to easily introduce rain water or the like entered the exhaust pipe through the descending slope of the exhaust adapter into the exhaust tube. The rain water introduced into the exhaust tube enters the condensing type water heater and is collected by a drainage water receptacle disposed inside the water heater, and is thereafter discharged to the outside of the water heater together with the drainage water.

In the exhaust structure for water heater as described above, the water heater is a non-condensing type water heater. The exhaust adapter includes an adapter main body, a deflector plate and a deflector plate supporting member. The adapter main body is formed to have an annular shape enclosing a through hole. The deflector plate is mounted on one surface of the adapter main body and is configured to cover the entire surface right above the through hole. The deflector plate supporting member is configured to support the deflector plate on one surface of the adapter main body such that a gap is present between the deflector plate and one surface of the adapter main body.

Thus, the rain water or the like entered the exhaust pipe can be prevented from directly entering the exhaust tube by the deflector plate. Moreover, since the gap is secured between the deflector plate and one surface of the adapter main body by the deflector plate supporting member, it is possible to reduce the exhaust resistance against the exhaust gas flowing from the exhaust tube toward the exhaust pipe.

In the exhaust structure for water heater as described above, an outer diameter of the deflector plate is sized smaller than an inner diameter of the exhaust pipe. Thus, it is possible to reduce the exhaust resistance against the exhaust gas flowing between the outer peripheral surface of the deflector plate and the inner peripheral surface of the exhaust pipe.

In the exhaust structure for water heater as described above, the water heater is a non-condensing type water heater. The exhaust adapter includes an annular projection member projecting from one surface of the exhaust adapter and surrounding the through hole. Thus, it is possible to prevent the rain water or the like entered the exhaust pipe from further entering the exhaust tube through the annular projection member.

In the exhaust structure for water heater as described above, the water heater is a non-condensing type water heater. The exhaust adapter includes one surface and the other surface facing each other. The exhaust tube extends downward from the other surface of the exhaust adapter to be connected to the water heater and protrudes above one surface thereof. Thus, it is possible to prevent the rain water or the like entered the exhaust pipe from entering the exhaust tube by the way of the exhaust tube protruding above one surface of the exhaust adapter.

In the exhaust structure for water heater as described above, the water heater is a non-condensing type water heater. One surface of the exhaust adapter includes an inclined face with a descending slope in the direction from the inner periphery toward the outer periphery. Thus, the rain water or the like entered the exhaust pipe can be guided to the outer periphery of the exhaust adapter by the descending slope, preventing the rain water or like from entering the exhaust tube located at the inner periphery.

In the exhaust structure for water heater as described above, the water heater is a non-condensing type water heater. The exhaust adapter includes one surface and the other surface facing each other, and a drain pipe insertion hole penetrating from one surface to the other surface. Thus, the rain water or the like entered the exhaust pipe can be discharged from one surface of the exhaust adapter to the other surface of the exhaust adapter through the drain pipe insertion hole, preventing the rain water or like from entering the exhaust tube.

In the exhaust structure for water heater as described above, the water heater is a non-condensing type water heater. A water draining through hole is provided in the exhaust pipe at any position higher than the position where the outer peripheral surface of the exhaust adapter presses the inner peripheral surface of the exhaust pipe. Thus, the rain water or the like entered the exhaust pipe can be discharged from the inside of the exhaust pipe to the outside thereof through the water draining through hole, preventing the rain water or like from entering the exhaust tube.

A method for installing exhaust adapter according to the present invention includes the following steps.

Firstly, an exhaust adapter is prepared. The exhaust adapter is formed to have an annular shape enclosing a through hole, and is configured to have an inner diameter sized not greater than an outer diameter of an exhaust tube connected to a water heater and an outer diameter sized not smaller than an inner diameter of an exhaust pipe. Subsequently, the exhaust adapter is fitted on an outer peripheral surface of the exhaust tube so that an inner peripheral surface of the exhaust adapter presses the outer peripheral surface of the exhaust tube and to an inner peripheral surface of the exhaust pipe so that an outer peripheral surface of the exhaust adapter presses the inner peripheral surface of the exhaust pipe.

According to the method for installing exhaust adapter of the present invention, it is possible to fit the exhaust adapter on the outer peripheral surface of the exhaust tube so that the inner peripheral surface of the exhaust adapter presses the outer peripheral surface of the exhaust tube and on the inner peripheral surface of the exhaust pipe so that the outer peripheral surface of the exhaust adapter presses the inner peripheral surface of the exhaust pipe. Thus, it is possible to fix a replacement exhaust tube relative to an existing exhaust pipe, allowing the replacement of the water heater to be performed easily and cheaply without involving changes on the appearance of a residential house.

In the method for installing exhaust adapter described above, an exhaust terminal mounted to a top end of the exhaust pipe is removed from the exhaust pipe before the step of fitting the exhaust adapter on the outer peripheral surface of the exhaust tube and on the inner peripheral surface of the exhaust pipe, and the exhaust terminal is mounted at the top end of the exhaust pipe after the step of fitting the exhaust adapter on the outer peripheral surface of the exhaust tube and on the inner peripheral surface of the exhaust pipe. Thus, it is possible to dispose the exhaust adapter between the exhaust tube and the exhaust pipe after the exhaust tube has been inserted into the exhaust pipe.

The method for installing exhaust adapter described above further includes the step of mounting a positioning member to the inner peripheral surface of the exhaust pipe. Upon fitting the exhaust adapter on the inner peripheral surface of the exhaust pipe, the exhaust adapter is positioned relative to the exhaust pipe by fitting the exhaust adapter at any position where it abuts against the positioning member. Thus, upon inserting the exhaust adapter into the exhaust pipe, it is possible to easily position the exhaust adapter relative to the exhaust pipe through the positioning member.

In the method for installing exhaust adapter described above, the step of fitting the exhaust adapter on the inner peripheral surface of the exhaust pipe includes the step of temporarily fixing the exhaust adapter to the inner peripheral surface of the exhaust pipe, and the step of firmly fixing the temporarily fixed exhaust adapter relative to the exhaust pipe by using a fixing member from the outside of the exhaust pipe. Thus, it is possible to fix the exhaust adapter inside the exhaust pipe with a small number of components.

The method for installing exhaust adapter described above further includes the step of providing a water draining through hole in the exhaust pipe at any position higher than the position where the outer peripheral surface of the exhaust adapter presses the inner peripheral surface of the exhaust pipe after the step of fitting the exhaust adapter on the inner peripheral surface of the exhaust pipe. Thus, the rain water or the like entered the exhaust pipe can be discharged from the inside of the exhaust pipe to the outside thereof through the water draining through hole, preventing the rain water or like from entering the exhaust tube.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 29 is a cross sectional view illustrating a first step of a method for installing exhaust adapter for installing the exhaust adapter illustrated in FIG. 27.

DESCRIPTION OF THE PREFERRED EMBODIMENTS

Hereinafter, embodiments of the present invention will be described with reference to the drawings.

First Embodiment

First, the configurations of an exhaust adapter according to an embodiment of the present invention and an exhaust structure for water heater including the same will be described with reference to FIGS. 1 to 3.

Figure 1:
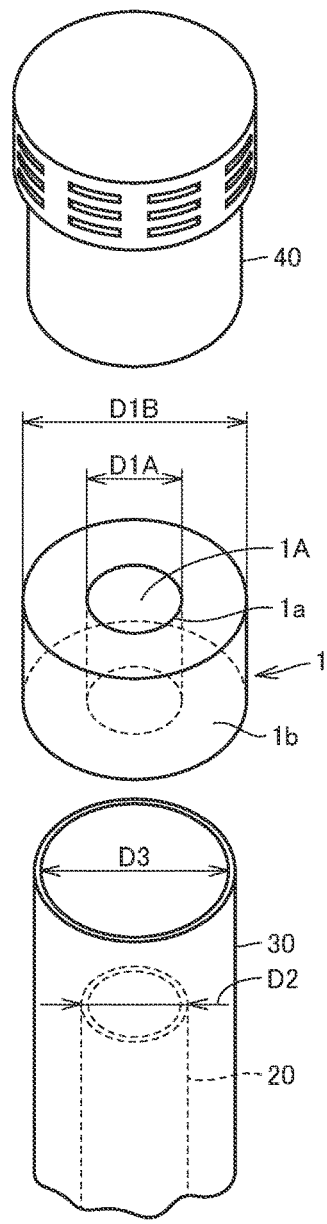
FIG. 1 is an exploded perspective view schematically illustrating an exhaust adapter, an exhaust tube, an exhaust pipe and an exhaust terminal according to a first embodiment of the present invention.

With reference to FIG. 1, an exhaust adapter 1 according to the present embodiment is configured to fix an exhaust tube (flexible exhaust tube) 20 relative to an exhaust pipe (B vent) 30. Exhaust adapter 1 is formed to have an annular shape enclosing a through hole 1A. Exhaust adapter 1 may be formed into any circular shape (such as a true circle, an enclosed track shape or an ellipse), any annular shape with multiple sides or any other annular shape, as long as the shape of an inner peripheral surface of exhaust adapter 1 matches the shape of an outer peripheral surface of exhaust tube 20 and the shape of an outer peripheral surface thereof matches the shape of an inner peripheral surface of exhaust pipe 30.

In exhaust adapter 1, at least an inner peripheral surface 1a and an outer peripheral surface 1b of the annular-shaped adapter are made of an elastic material. The elastic material, for example, is preferably a soft resin, or preferably Ethylene-Propylene-Diene Monomer (EPDM), soft polyvinyl chloride (PVC), Gore-Tex (registered trademark), SOFLEX (registered trademark), silicone rubber, fluorine rubber, chloroprene rubber (CR) or halogenated butyl rubber (IIR).

Exhaust adapter 1 may be made of one kind of elastic material or multiple kinds of elastic materials different from each other.

Exhaust adapter 1 is configured to be fitted on the outer periphery of exhaust tube 20 so that inner peripheral surface 1a of exhaust adapter 1 presses the outer peripheral surface of exhaust tube 20. Specifically, before exhaust adapter 1 is fitted on the outer periphery of exhaust tube 20, an inner diameter D1A of exhaust adapter 1 is sized not greater than an outer diameter D2 of exhaust tube 20 (D1A≤D2). As described above, inner peripheral surface 1a of exhaust adapter 1 is made of an elastic material.

Thus, while inner peripheral surface 1a of exhaust adapter 1 is being elastically deformed so as to enlarge inner diameter D1A of exhaust adapter 1, exhaust adapter 1 can be fitted on the outer periphery of exhaust tube 20, and after that, inner peripheral surface 1a of exhaust adapter 1 will restore its original shape. While exhaust adapter 1 is being fitted on the outer periphery of exhaust tube 20, the restoration feature of inner peripheral surface 1a of exhaust adapter 1 allows inner peripheral surface 1a of exhaust adapter 1 to press the outer peripheral surface of exhaust tube 20.

Meanwhile, exhaust adapter 1 is configured to be fitted into exhaust pipe 30 so that outer peripheral surface 1b of exhaust adapter 1 presses the inner peripheral surface of exhaust pipe 30. Specifically, before exhaust adapter 1 is fitted into exhaust pipe 30, an outer diameter D1B of exhaust adapter 1 is sized not smaller than an inner diameter D3 of exhaust pipe 30 (D1B≥D3). As described above, outer peripheral surface 1b of exhaust adapter 1 is made of an elastic material.

Thus, while outer peripheral surface 1b of exhaust adapter 1 is being elastically deformed so as to shrink outer diameter D1B of exhaust adapter 1, exhaust adapter 1 is inserted into exhaust pipe 30, and after that, outer peripheral surface 1b of exhaust adapter 1 will restore its original shape. While exhaust adapter 1 is being fitted into exhaust pipe 30, the restoration feature of outer peripheral surface 1b of exhaust adapter 1 allows outer peripheral surface 1b of exhaust adapter 1 to press the inner peripheral surface of exhaust pipe 30.

An upper end of exhaust pipe 30 is mounted with an exhaust terminal (rain cap) 40.

Figure 2:
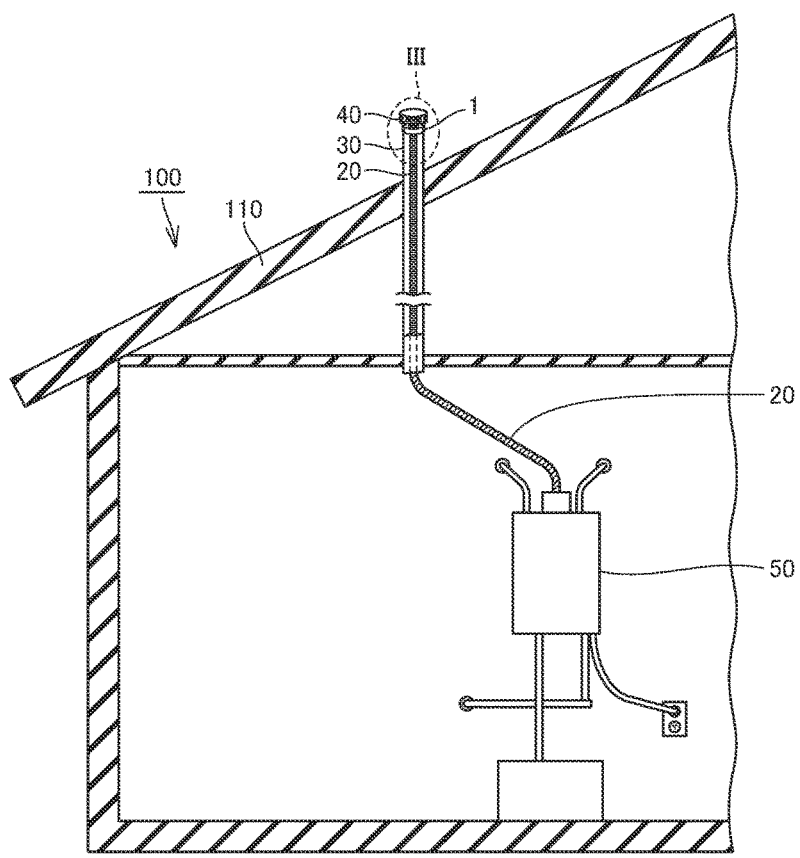
FIG. 2 is a plan view schematically illustrating an exhaust structure for water heater which has been installed in a residential house according to the first embodiment of the present invention.

With reference to FIG. 2, the exhaust structure for water heater according to the present embodiment generally includes exhaust adapter 1, exhaust tube 20, exhaust tube 30, exhaust terminal 40 and a water heater 50. The exhaust structure for water heater is configured to discharge the exhaust gas generated from combustion in water heater 50 to the outdoor side through a roof 110 of a residential house 100, for example.

Water heater 50 is, for example, an instantaneous water heater which supplies hot water by utilizing the heat generated through combusting a fuel such as combustion gas. As to be described below, water heater 50 may be a condensing type water heater or a non-condensing water heater. Water heater 50 is disposed inside residential house 100 (for example, inside a boiler room).

Exhaust tube 20 is connected to an exhaust unit of water heater 50. Exhaust tube 20 extends to the outdoor side of residential house 100 and is configured to introduce the exhaust gas generated in water heater 50 to the outdoor side. Exhaust tube 20 is, for example, an accordion pipe or a spiral pipe, the outer peripheral surface of which is formed to have an accordion shape or a spiral groove shape.

Exhaust pipe 30 is disposed to penetrate, for example, roof 110 or a wall of residential house 100, extending from the indoor side to the outdoor side. Exhaust pipe 30 is configured to have a larger diameter than exhaust tube 20, and a part of exhaust tube 20 is inserted inside exhaust pipe 30.

Exhaust terminal 40 is mounted to a distal end (upper end) of exhaust pipe 30 in the outdoor side. Exhaust terminal 40 may be an outer cover mounted around the outer peripheral surface of exhaust pipe 30 or may be an inner cover mounted on the inner peripheral surface of exhaust pipe 30.

Exhaust gas guided by exhaust tube 20 can be discharged to the outdoor side of residential house 100 from exhaust terminal 40 through the intermediary of exhaust pipe 30.

Figure 3:
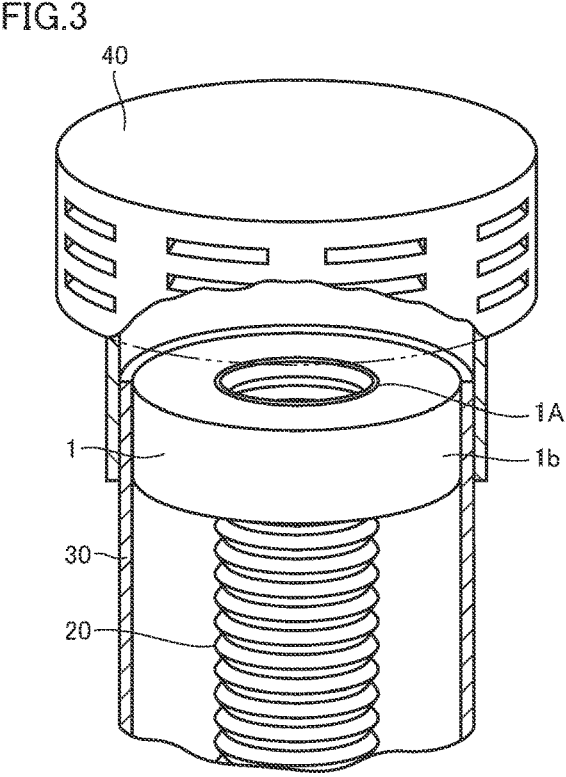
FIG. 3 is a partial perspective view illustrating an enlarged region III in FIG. 2.

With reference to FIGS. 2 and 3, exhaust adapter 1 is configured to fix exhaust tube 20 relative to exhaust pipe 30 as described above, and it is fitted on the outer peripheral surface of exhaust tube 20 as well as on the inner peripheral surface of exhaust pipe 30. While exhaust adapter 1 is being fitted on the outer peripheral surface of exhaust tube 20, inner peripheral surface 1a of exhaust adapter 1 presses the outer peripheral surface of exhaust tube 20, and while exhaust adapter 1 is being fitted on the inner peripheral surface of exhaust pipe 30, outer peripheral surface 1b of exhaust adapter 1 presses the inner peripheral surface of exhaust pipe 30.

Thus, inner peripheral surface 1a of exhaust adapter 1 is in close contact with the outer peripheral surface of exhaust tube 20, and meanwhile outer peripheral surface 1b of exhaust adapter 1 is in close contact with the inner peripheral surface of exhaust pipe 30. Therefore, exhaust tube 20 can be firmly fixed relative to exhaust pipe 30 by exhaust adapter 1, and moreover, the exhaust gas can be prevented from leaking into the space between exhaust tube 20 and exhaust pipe 30, and thereby preventing it from flowing back to the indoor side by exhaust adapter 1.

According to the present embodiment, as illustrated in FIGS. 1 to 3, while outer peripheral surface 1b of exhaust adapter 1 is being elastically deformed so as to shrink outer diameter D1B of exhaust adapter 1, exhaust adapter 1 can be inserted into exhaust pipe 30. After that, due to the restoration feature of outer peripheral surface 1b of exhaust adapter 1, outer peripheral surface 1b of exhaust adapter 1 presses the inner peripheral surface of exhaust pipe 30. Meanwhile, while inner peripheral surface 1a of exhaust adapter 1 is being elastically deformed so as to enlarge inner diameter D1A of exhaust adapter 1, exhaust adapter 1 can be fitted on the outer periphery of exhaust tube 20. After the fitting, due to the restoration feature of inner peripheral surface 1a of exhaust adapter 1, inner peripheral surface 1a of exhaust adapter 1 presses the outer peripheral surface of exhaust tube 20.

Thereby, it is possible to fit exhaust adapter 1 on the inner peripheral surface of exhaust pipe 30 so that outer peripheral surface 1b of exhaust adapter 1 presses the inner peripheral surface of exhaust pipe 30 and fit exhaust adapter 1 on the outer peripheral surface of exhaust tube 20 so that inner peripheral surface 1a of exhaust adapter 1 presses the outer peripheral surface of exhaust tube 20. Thus, it is possible to fix a replacement exhaust tube 20 relative to an existing exhaust pipe 30, allowing the replacement of the water heater to be performed easily and cheaply without involving changes on the appearance of a residential house.

A caulking treatment may be performed on contact portions between outer peripheral surface 1b of exhaust adapter 1 and the inner peripheral surface of exhaust pipe 30 and contact portions between inner peripheral surface 1a of exhaust adapter 1 and the outer peripheral surface of exhaust tube 20. Through the caulking treatment, the exhaust gases can be prevented from flowing back to the indoor side more reliably.

Hereinafter, a modification of exhaust adapter 1 of the present embodiment, which can be used in either a condensing type or a non-condensing type water heater 50, will be described with reference to FIGS. 4 to 7.

Figure 4:
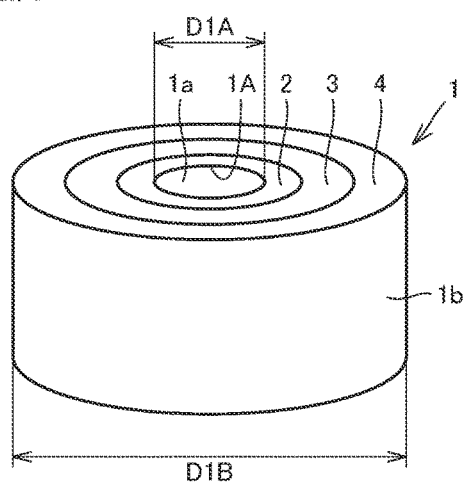
FIG. 4 is a perspective view schematically illustrating the exhaust adapter according to the first embodiment of the present invention.

With reference to FIG. 4, exhaust adapter 1 is formed to have an annular shape enclosing through hole 1A. Exhaust adapter 1 includes a first annular member 2 located innermost the annular shape, a second annular member 4 located outermost the annular shape, and a third annular member 3 located between first annular member 2 and second annular member 4. Third annular member 3 has a higher hardness than any of first annular member 2 and second annular member 4.

The hardness in the present specification may be, for example, any of Rockwell hardness (R scale, L scale and M scale), Brinell hardness, Vickers hardness, Durometer hardness, Barcol Hardness, Mohs hardness, Martens hardness, Bierbaum hardness, and Shore hardness. Moreover, it is preferable that first annular member 2 and second annular member 4 are made of a material having an elastic deformation range greater than third annular member 3.

Thus, first annular member 2 and second annular member 4 are made of a soft material, and third annular member 3 is made of a hard material. First annular member 2 and second annular member 4 are preferably made of, for example, a soft resin, or preferably made of, for example, EPDM (Ethylene-Propylene-Diene Monomer), soft PVC, Gore-Tex (registered trademark), SOFLEX (registered trademark), silicone rubber, fluorine rubber, chloroprene rubber (CR), halogenated butyl rubber (IIR). Third annular member 3 is preferably made of, for example, a hard resin, or preferably made of, for example, hard PVC, polypropylene (PP), polyethylene (PE), polyphenylene sulfide (PPS), syndiotactic Polystyrene (SPS), modified polyphenylene ether (PPE), polyphenylene oxide (PPO), polyimide (PI), silicone resin, or fluorocarbon resin.

In addition, the material of each of the first to third annular members 2 to 4 may be selected from a proper combination of soft materials and hard materials resistant to acid such as phenol resin, epoxy resin, silicone resin, fluorine resin such as tetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin.

Third annular member 3 may be made of materials such as ceramics or metals in addition to the resins described above also as long as the material can maintain the shape of exhaust adapter 1. Further, each of the first and second annular members 2 and 4 may be a packing ring, an O-ring or the like.

Further, first and second annular members 2 and 4 may be made of different materials from third annular member 3, or may be made of the same material as third annular member 3 as long as the same material may be treated by a curing process or the like to provide different hardness. Moreover, first annular member 2 and second annular member 4 may be made of the same material or may be made of different materials.

Exhaust adapter 1 may be provided in such a manner that firstly third annular member 3 is prepared, and subsequently first annular member 2 and second annular member 4 are mounted on the inner peripheral surface and the outer peripheral surface of third annular member 3, respectively. Exhaust adapter 1 may be provided as a resin molded article having a three-layer structure composed of first to third annular members of 2 to 4.

In exhaust adapter 1, first annular member 2 located innermost the annular shape and second annular member 4 located outermost the annular shape are configured to have a lower hardness than third annular member 3. Thus, while first annular member 2 of exhaust adapter 1 is being elastically deformed so as to enlarge inner diameter D1A (FIG. 4) of exhaust adapter 1, exhaust adapter 1 can be fitted on the outer periphery of exhaust tube 20 as illustrated in FIG. 3, and after that, due to the restoration feature of first annular member 2 of exhaust adapter 1, inner peripheral surface 1a of exhaust adapter 1 presses the outer peripheral surface of exhaust tube 20. Further, while second annular member 4 of exhaust adapter 1 is being elastically deformed so as to shrink outer diameter D1B (FIG. 4) of exhaust adapter 1, exhaust adapter 1 can be fitted inside exhaust pipe 30 as illustrated in FIG. 3, and after that, due to the restoration feature of second annular member 4 of exhaust adapter 1, outer peripheral surface 1b of exhaust adapter 1 presses the inner peripheral surface of exhaust pipe 30.

Thereby, it is possible to fit exhaust adapter 1 on the outer peripheral surface of exhaust tube 20 so that inner peripheral surface 1a of exhaust adapter 1 presses the outer peripheral surface of exhaust tube 20 and fit exhaust adapter 1 on the inner peripheral surface of exhaust pipe 30 so that outer peripheral surface 1b of exhaust adapter 1 presses the inner peripheral surface of exhaust pipe 30. Thus, it is possible to fix a replacement exhaust tube 20 relative to an existing exhaust pipe 30, allowing the replacement of the water heater to be performed easily and cheaply without involving changes on the appearance of a residential house.

Figure 5:
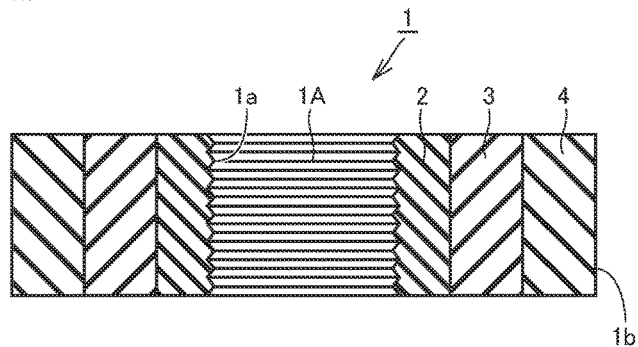
FIG. 5 is a cross sectional view schematically illustrating that an inner peripheral surface of the exhaust adapter according to the first embodiment of the present invention has an accordion shape.

With reference to FIG. 5, inner peripheral surface 1a of exhaust adapter 1 includes a portion of an accordion shape. The other components are the same as those in exhaust adapter 1 illustrated for example in FIG. 4. Thus, in the case where the outer peripheral surface of exhaust tube 20 to be inserted into through hole 1A of exhaust adapter 1 has an accordion shape, it is possible to match the accordion shape of inner peripheral surface 1a of exhaust adapter 1 with the accordion shape of exhaust tube 20. Therefore, it is possible to make inner peripheral surface 1a of exhaust adapter 1 in close contact with the outer peripheral surface of exhaust tube 20. It is preferable that the pitch between the irregularities of the accordion shape formed on inner peripheral surface 1a of exhaust adapter 1 and the pitch between the irregularities of the accordion shape formed on the outer peripheral surface of exhaust tube 20 are equal to each other.

Figure 6:
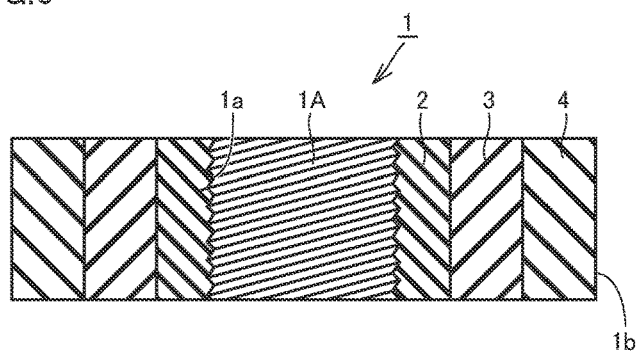
FIG. 6 is a cross sectional view schematically illustrating that the inner peripheral surface of the exhaust adapter according to the first embodiment of the present invention has a spiral groove shape.

With reference to FIG. 6, inner peripheral surface 1a of exhaust adapter 1 includes a portion of a spiral groove shape. The other components are the same as those in exhaust adapter 1 illustrated for example in FIG. 4. Thus, in the case where the outer peripheral surface of exhaust tube 20 to be inserted into through hole 1A of exhaust adapter 1 has a spiral groove shape, it is possible to match the spiral groove shape of inner peripheral surface 1a of exhaust adapter 1 with the spiral groove shape of exhaust tube 20. Therefore, it is possible to make inner peripheral surface 1a of exhaust adapter 1 in close contact with the outer peripheral surface of exhaust tube 20.

Figure 7:
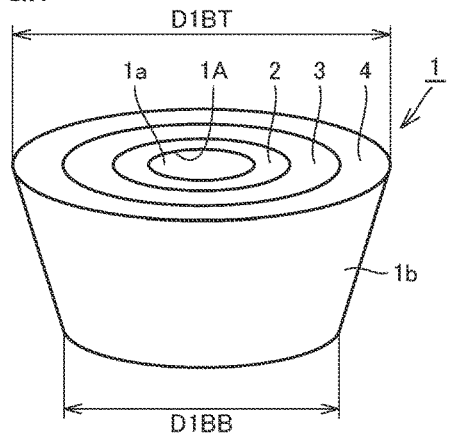
FIG. 7 is a perspective view schematically illustrating that the outer peripheral surface of the exhaust adapter according to the first embodiment of the present invention has a tapered shape.

With reference to FIG. 7, outer peripheral surface 1b of exhaust adapter 1 has a tapered shape with the outer diameter decreasing from one surface (the upper surface in the drawing) toward the other surface (the lower surface in the drawing). In other words, outer diameter D1BB of exhaust adapter 1 at the side of the other surface is sized smaller than outer diameter D1BT of exhaust adapter 1 at the side of the one surface. The other components are the same as those in exhaust adapter 1 illustrated for example in FIG. 4. Thus, it is possible to easily insert exhaust adapter 1 into exhaust pipe 30 by inserting exhaust adapter 1 from the side of the other surface having a smaller outer diameter. Moreover, as exhaust adapter 1 is inserted into exhaust pipe 30, the portion of exhaust adapter 1 having a greater outer diameter will be supported by the exhaust pipe, and thereby, exhaust adapter 1 can be firmly supported inside exhaust pipe 30.

The accordion shape in FIG. 5 or the spiral groove shape in FIG. 6 may be combined with the tapered shape in FIG. 7.

Hereinafter, the configuration of a condensing type water heater will be described with reference to FIG. 25, and a modification of exhaust adapter 1 of the present embodiment employed in the condensing type water heater will be described with reference to FIG. 8.

Figure 25:
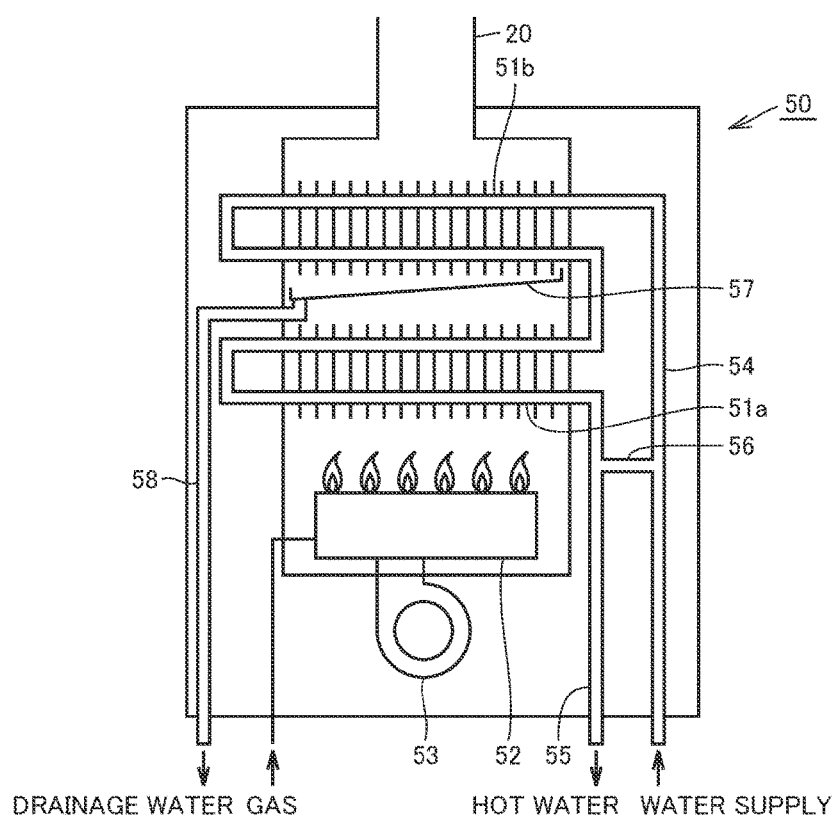
FIG. 25 is a schematic diagram schematically illustrating a condensing type water heater.

With reference to FIG. 25, in order to improve the thermal efficiency, the condensing type (latent heat recovery type) water heater 50 is provided with a secondary heat exchanger for recovering both sensible heat and latent heat (the latent heat preserved by water vapor in the combusted exhaust gas) from the combusted exhaust gas. Thus, water heater 50 of this type generally includes a primary heat exchanger 51a, a secondary heat exchanger 51b, a burner 52, a blower 53, pipes 54 to 56, a drainage water receptacle 57, and a drain pipe 58.

In condensing type water heater 50, the combustion gas after heat exchange, which would have been discharged in prior arts, is guided to pass through secondary heat exchanger 51b, and thereby the water inside secondary heat exchanger 51b is further heated by the combustion gas. During the process, the temperature of the combustion gas will drop to about 60° C., and thus water vapor contained in the combustion gas is condensed, which makes it possible to recover the latent heat.

One end of primary heat exchanger 51a and one end of secondary heat exchanger 51b are connected to each other. The other end of primary heat exchanger 51a is connected to pipe 55, and the other end of secondary heat exchanger 51b is connected to pipe 54. Pipe 54 and pipe 55 are connected to each other by a bypass pipe 56.

Burner 52 is configured to combust combustion gas so as to perform heat exchange respectively with primary heat exchanger 51a and secondary heat exchanger 51b. Primary heat exchanger 51a is disposed closer to burner 52 than secondary heat exchanger 51b. Blower 53 is used to supply air required for combustion to burner 52.

As described above, since condensing type water heater 50 is structurally designed to condense the water vapor in the combustion gas, the condensed water (drainage water) will be generated inevitably, and the drainage water is required to be discharged. Therefore, drainage water receptacle 57 is disposed below second heat exchanger 51b. The drainage water collected by drainage water receptacle 57 is configured to be discharged to the outside of water heater 50 through drain pipe 58.

Thus, in order to discharge the drainage water generated in secondary heat exchanger 51b, condensing type water heater 50 is provided with drainage water receptacle 57 and drain pipe 58. Therefore, even though the rain water or the like enters water heater 50 through exhaust tube 20, and it will be collected by drainage water receptacle 57 and discharged to the outside of water heater 50 together with the drainage water through drain pipe 58.

Figure 8:
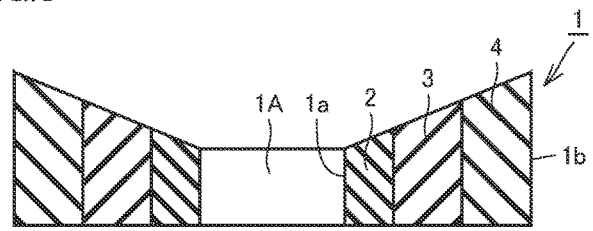
FIG. 8 is a section view schematically illustrating that an upper surface of the exhaust adapter according to the first embodiment of the present invention includes an inclined face with a descending slope in the direction from the outer periphery toward the inner periphery.

With reference to FIG. 8, when exhaust adapter 1 is employed in condensing type water heater 50 described above, one surface (upper surface) of exhaust adapter 1 may be formed to include an inclined face with a descending slope in the direction from the outer periphery toward the inner periphery. The other components are the same as those in exhaust adapter 1 as illustrated for example in FIG. 4. Thus, it is possible to easily introduce the rain water or the like entered exhaust pipe 30 to exhaust tube 20 through the descending slope of exhaust adapter 1. The rain water introduced into exhaust tube 20 enters condensing type water heater 50 illustrated in FIG. 25 and is collected by drainage water receptacle 57 disposed inside water heater 50, and thereafter is discharged to the outside of water heater 50 together with the drainage water through drain pipe 58.

Hereinafter, the configuration of a non-condensing type water heater will be described with reference to FIG. 26, and a modification of exhaust adapter 1 according to the present embodiment employed in the non-condensing type water heater will be described with reference to FIGS. 9 to 18.

Figure 26:
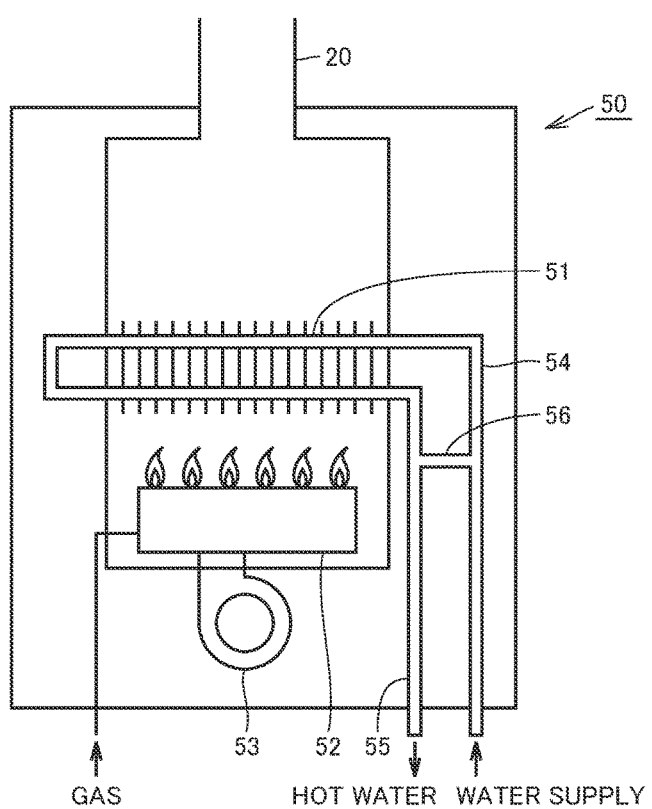
FIG. 26 is a schematic diagram schematically illustrating a non-condensing type water heater.

With reference to FIG. 26, non-condensing type water heater 50 is structured by dispensing with the secondary heat exchanger, the drainage water receptacle and the drain pipe from condensing type water heater 50 illustrated in FIG. 25. Since the other components of non-condensing type water heater 50 except those described above are substantially the same as the components of condensing type water heater 50, the same component will be assigned with the same reference numeral, and the description thereof will not be repeated.

Figure 9:
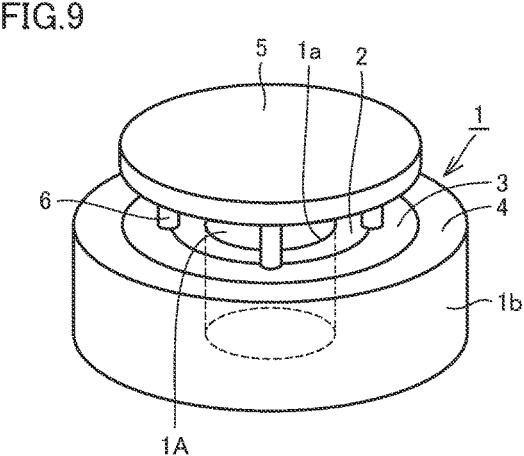
FIG. 9 is a perspective view schematically illustrating that the exhaust adapter according to the first embodiment of the present invention is provided with a deflector plate and a deflector plate supporting member.
Figure 10:
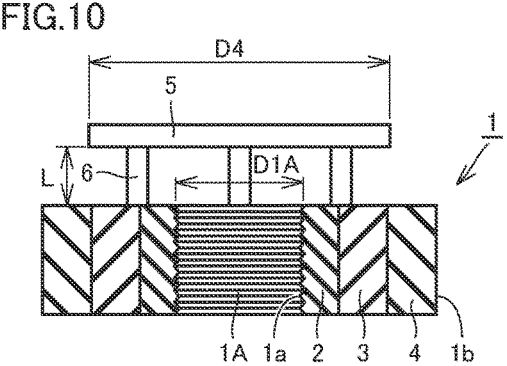
FIG. 10 is a cross sectional view schematically illustrating that the exhaust adapter according to the first embodiment of the present invention is provided with a deflector plate and a deflector plate supporting member.

With reference to FIGS. 9 to 10, exhaust adapter 1 is provided with an adapter main body (2-4), a deflector plate 5 and a deflector plate supporting member 6. The adapter main body (2-4) has an annular shape enclosing through hole 1A. The adapter main body (2-4) is configured structurally the same as the first to third annular members 2 to 4 of exhaust adapter 1 illustrated for example in FIG. 4. Deflector plate 5 is mounted on one surface (upper surface) of the adapter main body (2-4) and is configured to cover the entire surface right above through hole 1A. An outer diameter D4 of deflector plate 5 is sized greater than diameter D1A of through hole 1A enclosed by the adapter main body (2-4). Deflector plate supporting member 6 is configured to support deflector plate 5 on one surface of adapter main body (2-4) such that a gap is present between deflector plate 5 and one surface of the adapter main body (2-4).

Thus, the rain water or the like entered exhaust pipe 30 can be prevented from directly entering exhaust tube 20 by deflector plate 5. Moreover, since a gap is secured between deflector plate 5 and one surface of the adapter main body (2-4) by deflector plate supporting member 6, it is possible to reduce the exhaust resistance against the exhaust gas flowing from exhaust tube 20 toward exhaust pipe 30.

Figure 11:
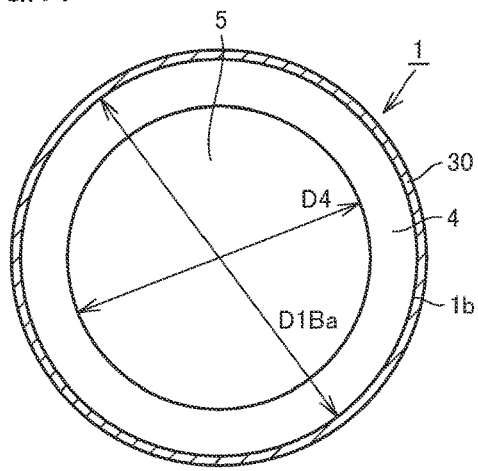
FIG. 11 is a plan view schematically illustrating that the exhaust adapter provided with the deflector plate and the deflector plate supporting member of FIGS. 9 and 10 is fitted inside the exhaust pipe.

With reference to FIG. 11, when exhaust adapter 1 is being fitted inside exhaust pipe 30, outer diameter D4 of deflector plate 5 is sized smaller than an inner diameter D1Ba of exhaust pipe 30. Thus, it is possible to reduce the exhaust resistance against the exhaust gas flowing between the outer periphery of deflector plate 5 and the inner periphery of exhaust pipe 30.

In order to prevent the gap between the outer periphery of deflector plate 5 and the inner periphery of exhaust pipe 30 from becoming an exhaust resistance, it is necessary to make the area of the gap equal to or greater than the cross sectional area of exhaust tube 20. Therefore, the following equation can be derived, denoting a relationship of dimensions for each part so as to prevent the gap from becoming an exhaust resistance.

$$\pi(D1Ba/2)^2 - \pi(D4/2)^2 \geq \pi(D1A/2)^2$$

$$(D1Ba/2)^2 - (D4/2)^2 \geq (D1A/2)^2 \quad (1)$$

Thus, it is preferable that the dimensions for each part are set to satisfy the relationship of Equation (1).

With reference to FIG. 10, in order to prevent the gap between one surface of the adapter main body (2-4) and deflector plate 5 from becoming an exhaust resistance, if the height of the gap is denoted by L, then it is necessary to make the area of the gap equal to or greater than the cross sectional area of exhaust tube 20. Therefore, the following equation can be derived, denoting the relationship of dimensions for each part so as to prevent the gap from becoming an exhaust resistance.

$$2\pi(D1A/2) \times L \geq \pi(D1A/2)^2$$

$$L \geq D1A/4 \qquad (2)$$

Thus, it is preferable that height L of the gap is set to satisfy the relationship of Equation (2).

Figure 12:
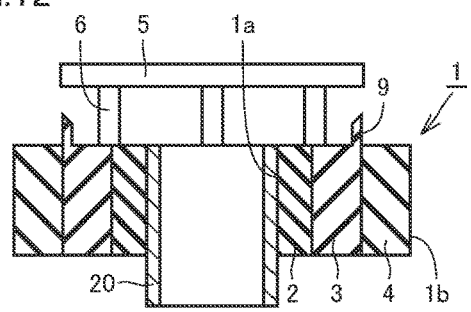
FIG. 12 is a cross sectional view schematically illustrating that the exhaust adapter includes an annular projection member projecting upward from the upper surface of the exhaust adapter according to the first embodiment of the present invention.

With reference to FIG. 12, the adapter main body (2-4) of exhaust adapter 1 may be provided with an annular projection member 9 projecting from one surface of the adapter main body and surrounding through hole 1A. Thus, the rain water or the like entered exhaust pipe 30 can be prevented from entering exhaust tube 20 by annular projection member 9.

Figure 13:
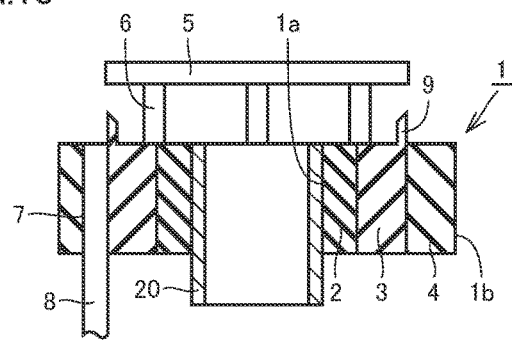
FIG. 13 is a cross sectional view schematically illustrating that the exhaust adapter includes a drain pipe insertion hole penetrating from the upper surface to the lower surface according to the first embodiment of the present invention.

With reference to FIG. 13, the adapter main body (2-4) of exhaust adapter 1 is provided with a drain pipe insertion hole 7 penetrating from one surface to the other surface, and a drain pipe 8 may be inserted into drain pipe insertion hole 7. Thus, the rain water or the like entered exhaust pipe 30 can be discharged from one surface of the adapter main body (2-4) of exhaust adapter 1 to the other surface thereof through drain pipe 8, preventing the rain water or like from entering exhaust tube 20.

Figure 14:
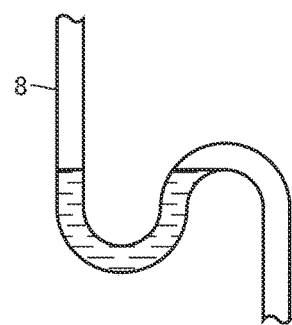
FIG. 14 is a plan view illustrating that the drain pipe inserted into the drain pipe insertion hole of FIG. 13 has a water trap.

With reference to FIG. 14, it is preferable that drain pipe 8 described above is configured to have a water trap. As the water trap, an S-trap being bent into an S shape, a P-trap, a U-trap, for example, may be employed appropriately. Accordingly, the water can be drained out through drain pipe 8, and meanwhile, the exhaust gas can be prevented from flowing back to the indoor side through drain pipe 8 by the water trap.

Figure 15:
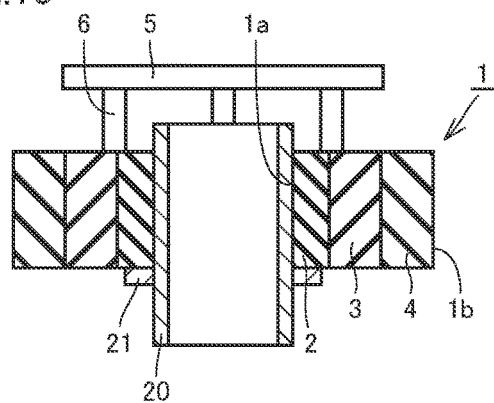
FIG. 15 is a cross sectional view schematically illustrating that the upper end of the exhaust tube protrudes from the upper surface of the exhaust adapter according to the first embodiment of the present invention.

With reference to FIG. 15, one end (upper end) of exhaust tube 20 may be configured to protrude above one surface of the adapter main body (2-4) of exhaust adapter 1. Further, exhaust tube 20 extends downward from the other surface of the adapter main body (2-4) of exhaust adapter 1 and is connected to water heater 50. Thus, it is possible to prevent the rain water or the like entered exhaust pipe 30 from entering exhaust tube 20 by the way of making exhaust tube 20 protrude above one surface of the adapter main body (2-4).

However, in the case where the end of exhaust tube 20 is configured to protrude above one surface of exhaust adapter 1, if a protrusion amount of exhaust tube 20 protruded from exhaust adapter 1 is too large, it will cause an exhaust resistance to occur. Therefore, it is important to control the protrusion amount of exhaust tube 20 protruded from exhaust adapter 1. In order to control the protrusion amount, it is preferable to mount a positioning member 21 of a ring shape, for example, on the outer peripheral surface of exhaust tube 20.

Upon inserting exhaust tube 20 into through hole 1A of exhaust adapter 1, exhaust adapter can be positioned relative to exhaust tube 20 when exhaust adapter 1 abuts against positioning member 21 at a predetermined position. Thus, it is possible to easily control the protrusion amount of exhaust tube 20 protruded from exhaust adapter 1, which makes it easy to prevent an exhaust resistance from being caused by the protrusion amount of exhaust tube 20.

Figure 16:
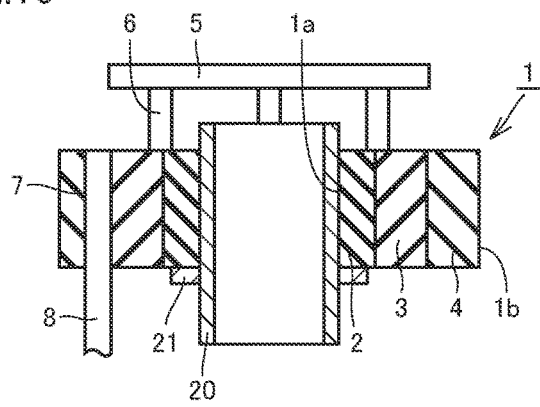
FIG. 16 is a cross sectional view schematically illustrating that a drain pipe insertion hole is provided in the exhaust adapter illustrated in FIG. 15.

With reference to FIG. 16, drain pipe insertion hole 7 and drain pipe 8 as illustrated in FIG. 14 may be provided in the structure where one end (upper end) of exhaust tube 20 protrudes above one surface of the adapter main body (2-4) as illustrated in FIG. 15.

Figure 17:
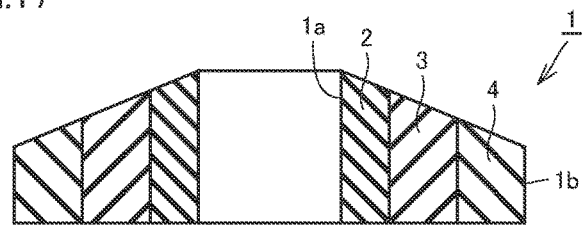
FIG. 17 is a section view schematically illustrating that an upper surface of the exhaust adapter according to the first embodiment of the present invention includes an inclined face with a descending slope in the direction from the inner periphery toward the outer periphery.

With reference to FIG. 17, one surface of exhaust adapter 1 may include an inclined face with a descending slope in the direction from the inner periphery toward the outer periphery. The other components are the same as those in exhaust adapter 1 illustrated for example in FIG. 4. Thus, the rain water or the like entered exhaust pipe 30 can be guided to the outer periphery of exhaust adapter 1 through the descending slope, preventing the rain water or like from entering exhaust tube 20 located at the inner periphery.

Figure 18:
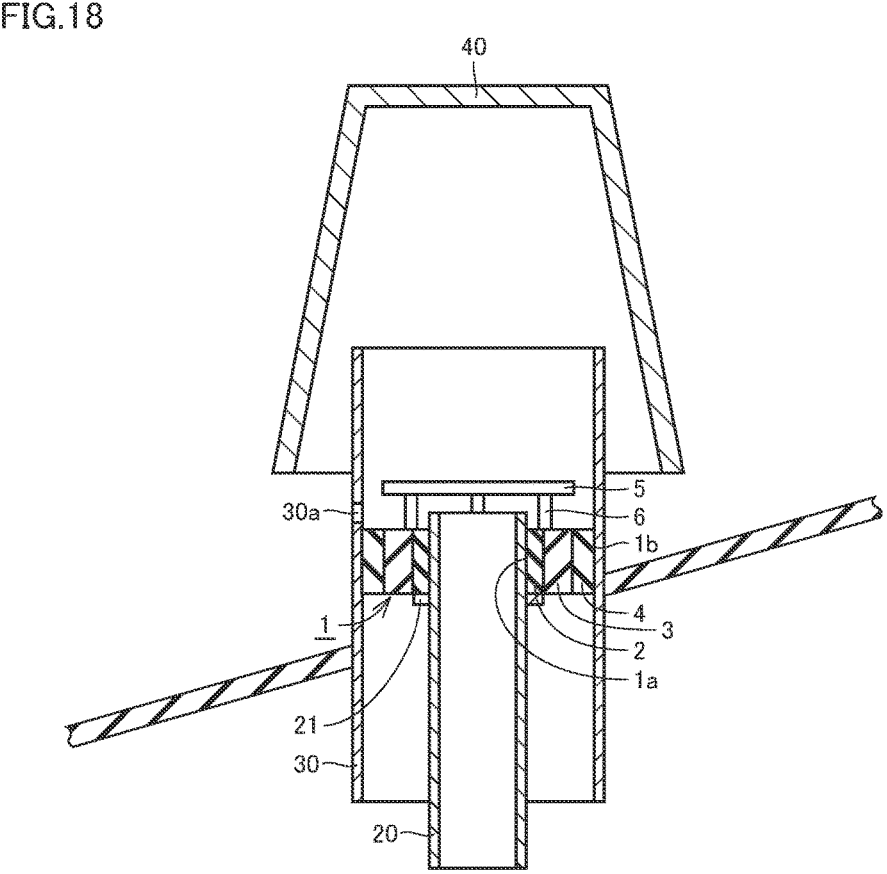
FIG. 18 is a cross sectional view schematically illustrating that a water draining through hole is provided in an exhaust structure for water heater according to the first embodiment of the present invention.

With reference to FIG. 18, a water draining through hole 30a may be provided in exhaust pipe 30 at any position higher than the position where outer peripheral surface 1b of exhaust adapter 1 presses the inner peripheral surface of exhaust pipe 30. Thus, the rain water or the like entered exhaust pipe 30 can be discharged from the inside of exhaust pipe 30 to the outside thereof through water draining through hole 30a, preventing the rain water or like from entering exhaust tube 20.

Hereinafter, another modification of the exhaust adapter will be described with reference to FIGS. 19 to 22.

Figure 19:
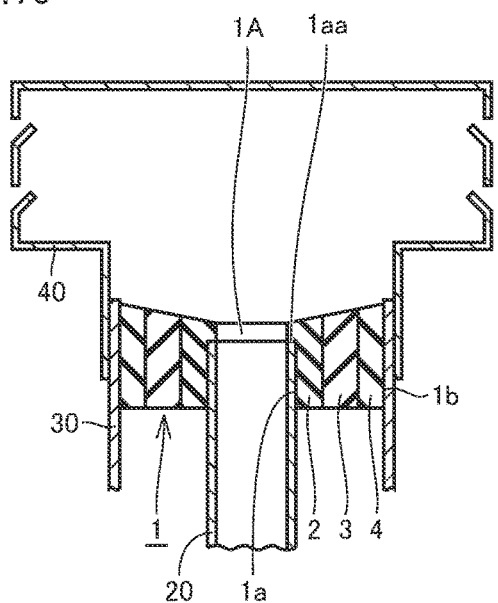
FIG. 19 is a cross sectional view schematically illustrating that any positioning projection for positioning the exhaust tube is provided on the inner peripheral surface of the exhaust adapter included in an exhaust structure for water heater according to the first embodiment of the present invention.

With reference to FIG. 19, a positioning projection 1aa for positioning exhaust tube 20 may be provided on inner peripheral surface 1a of exhaust adapter 1 having the configuration illustrated in FIG. 8, for example. Specifically, inner peripheral surface 1a of exhaust adapter 1 may be configured to include a small-diameter portion and a large-diameter portion having a diameter greater than the diameter of the small-diameter portion. Exhaust tube 20 is fitted inside the large-diameter portion, and positioning projection 1aa may be provided at the boundary between the large-diameter portion and the small-diameter portion of inner peripheral surface 1a.

Upon inserting exhaust tube 20 into through hole 1A of exhaust adapter 1, exhaust tube 20 may be inserted into through hole 1A of exhaust adapter 1 until one end of exhaust tube 20 abuts against positioning projections 1aa provided in exhaust adapter 1, which makes it easy to position exhaust adapter 1 relative to exhaust tube 20. Further, by setting the diameter of the small-diameter portion of inner peripheral surface 1a of exhaust adapter 1 equal to or greater than the inner diameter of exhaust tube 20, it is possible to prevent the small-diameter portion from becoming an exhaust resistance. In particular, positioning projection 1aa is preferably sized not more than the thickness of exhaust tube 20 in the radial direction.

Figure 20:
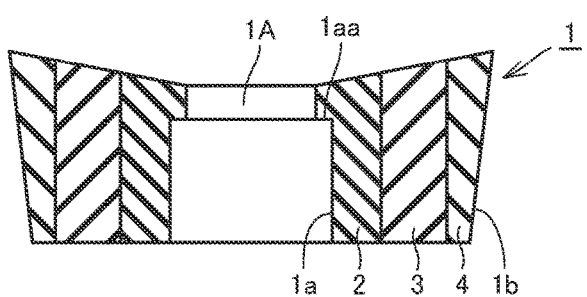
FIG. 20 is a cross sectional view schematically illustrating an enlarged exhaust adapter of FIG. 19.

With reference to FIG. 20, outer peripheral surface 1b of exhaust adapter 1 may be formed to have a tapered shape with the outer diameter decreasing from one surface (upper surface in the drawing) toward the other surface (lower surface in the drawing). Thus, it is possible to easily insert exhaust adapter 1 into exhaust pipe 30 by inserting exhaust adapter 1 from the side having a smaller outer diameter. Moreover, as exhaust adapter 1 is inserted into exhaust pipe 30, the portion of exhaust adapter 1 having a greater outer diameter will be supported by exhaust pipe 30, and thereby, exhaust adapter 1 can be firmly fixed inside exhaust pipe 30.

Figure 21:
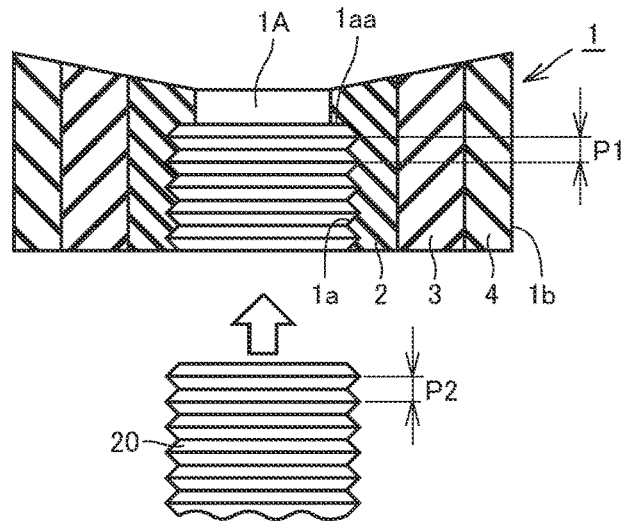
FIG. 21 is a cross sectional view schematically illustrating that a portion of an accordion shape is provided in the inner peripheral surface of the exhaust adapter in FIG. 19 according to an embodiment of the present invention.

With reference to FIG. 21, a portion of inner peripheral surface 1a of exhaust adapter 1 illustrated in FIG. 19, on which exhaust tube 20 will fit, may be formed into an accordion shape. Thus, in the case where the outer peripheral surface of exhaust tube 20 to be inserted into through hole 1A of exhaust adapter 1 has an accordion shape, it is possible to match the accordion shape of inner peripheral surface 1a of exhaust adapter 1 with the accordion shape of exhaust tube 20. Therefore, it is possible to make inner peripheral surface 1a of exhaust adapter 1 in close contact with the outer peripheral surface of exhaust tube 20.

It is preferable that the pitch P1 between the irregularities of the accordion shape formed on inner peripheral surface 1a of exhaust adapter 1 and the pitch P2 between the irregularities of the accordion shape formed on the outer peripheral surface of exhaust tube 20 are equal to each other.

Figure 22:
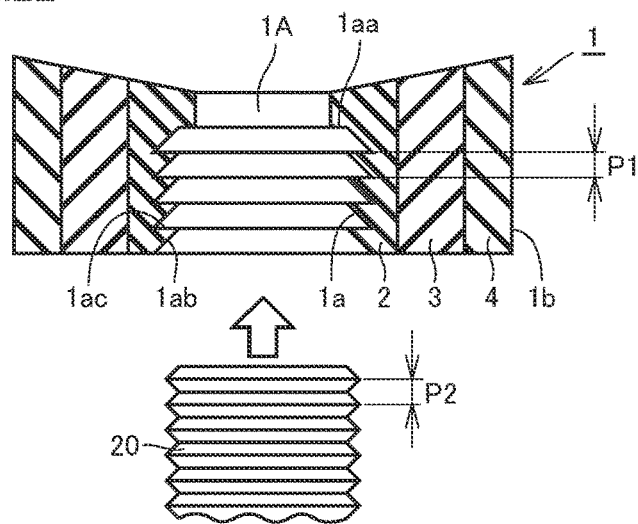
FIG. 22 is a cross sectional view schematically illustrating that the accordion shape provided in the inner peripheral surface of the exhaust adapter in FIG. 19 allows the exhaust tube to be inserted easily and to be pulled out difficultly.

With reference to FIG. 22, the accordion shape of the portion of inner peripheral surface 1a of exhaust adapter 1 illustrated in FIG. 19, on which exhaust tube 20 will fit, may be formed into such a shape that allows exhaust tube 20 to be inserted easily and to be pulled out difficultly. Specifically, the accordion shape of inner peripheral surface 1a of exhaust adapter 1 may be configured to include an inclined face 1ab facing the other surface of the adapter main body (2-4) and having a descending slope in the direction from the outer periphery toward the inner periphery, and an inclined face 1ac facing the one side of the adapter main body (2-4) and substantially parallel to the radial direction.

Note that in the above configuration, a pitch P1 between the recesses of the accordion shape formed on inner peripheral surface 1a of exhaust adapter 1 and a pitch P2 between the convexes of the accordion shape formed on the outer peripheral surface of exhaust tube 20 are equal to each other.

Although positioning projection 1aa which has been described with reference to FIGS. 19 to 22 is applied to exhaust adapter 1, of which one surface includes an inclined face with a descending slope in the direction from the outer periphery toward the inner periphery as illustrated in FIG. 8, it is also acceptable to apply positioning projection 1aa to the exhaust adapter illustrated in FIGS. 9 to 13, FIG. 17 and the like.

Hereinafter, a method for installing exhaust adapter 1 according to the present embodiment will be described with reference to FIG. 1, FIG. 23 and FIG. 24.

With reference to FIG. 1, firstly, exhaust adapter 1 is prepared. The exhaust adapter is formed to have an annular shape enclosing through hole 1A and is configured to have inner diameter D1A sized not greater than outer diameter D2 of exhaust tube 20 and outer diameter D1B sized not smaller than inner diameter D3 of exhaust pipe 30.

Figure 23:
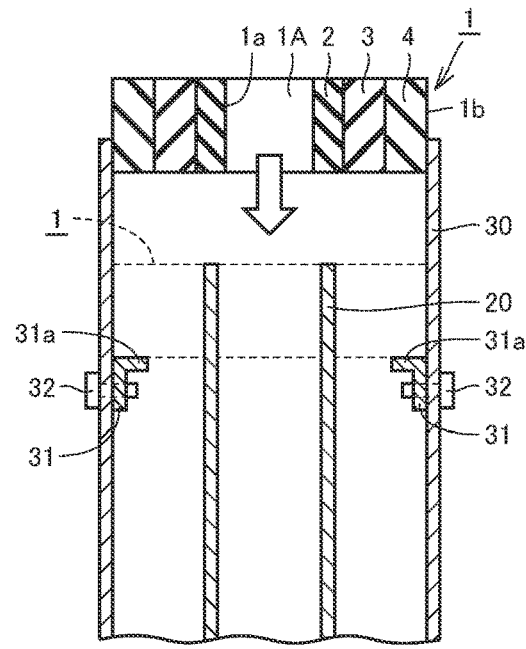
FIG. 23 is a cross sectional view illustrating a first example of a method for installing exhaust adapter according to the first embodiment of the present invention.

With reference to FIG. 23, while inner peripheral surface 1a of exhaust adapter 1 is being elastically deformed so as to enlarge inner diameter D1A of exhaust adapter 1, exhaust adapter 1 is fitted on the outer periphery of exhaust tube 20. After that, due to the restoration feature of inner peripheral surface 1a of exhaust adapter 1, inner peripheral surface 1a of exhaust adapter 1 presses the outer peripheral surface of exhaust tube 20.

Meanwhile, while outer peripheral surface 1b of exhaust adapter 1 is being elastically deformed so as to shrink outer diameter D1B of exhaust adapter 1, exhaust adapter 1 is inserted into exhaust pipe 30. After that, due to the restoration feature of outer peripheral surface 1b of exhaust adapter 1, outer peripheral surface 1b of exhaust adapter 1 presses the inner peripheral surface of exhaust pipe 30.

Thereby, exhaust adapter 1 is fitted on the outer peripheral surface of exhaust tube 20 so that inner peripheral surface 1a of exhaust adapter 1 presses the outer peripheral surface of exhaust tube 20 and on the inner peripheral surface of exhaust pipe 30 so that outer peripheral surface 1b of exhaust adapter 1 presses the inner peripheral surface of exhaust pipe 30. Thus, exhaust tube 20 can be firmly fixed relative to exhaust pipe 30 by exhaust adapter 1, and the exhaust gas can be prevented from leaking into the space between exhaust tube 20 and exhaust pipe 30, and thereby preventing it from flowing back to the indoor side by exhaust adapter 1.

In the method for installing described above, before fitting exhaust adapter 1 into exhaust pipe 30, a positioning member 31 may be mounted on the inner peripheral surface of exhaust pipe 30. The mounting of positioning member 31 on exhaust pipe 30 may be carried out by fixing positioning member 31 on exhaust pipe 30 through using a fixing member 32 such as a bolt, a screw or a bonding reagent.

After being mounted on the inner peripheral surface of exhaust pipe 30, positioning member 31 forms a flange 31a extending along the inner periphery of exhaust pipe 30. Therefore, when exhaust adapter 1 is being inserted into exhaust pipe 30 to a predetermined depth, exhaust adapter 1 abuts against flange 31a of positioning member 31, and is positioned relative to exhaust pipe 30. Thus, upon inserting exhaust adapter 1 into exhaust pipe 30, exhaust adapter 1 can be easily positioned relative to exhaust pipe 30 by using positioning member 31.

Figure 24:
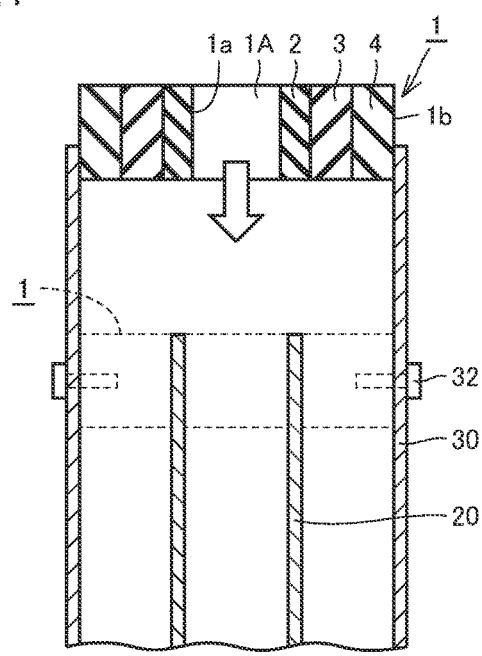
FIG. 24 is a cross sectional view illustrating a second example of a method for installing exhaust adapter according to the first embodiment of the present invention.

With reference to FIG. 24, it is acceptable that after exhaust adapter 1 is fitted on the inner peripheral surface of exhaust pipe 30 and temporarily fixed to the inner peripheral surface of exhaust pipe 30 without using any positioning member as described above, and thereafter the temporarily fixed exhaust adapter 1 is firmly fixed relative to exhaust pipe 30 by using fixing member (a bolt, a screw or the like) 32 from the outside of exhaust pipe 30. Accordingly, it is possible to fix exhaust adapter 1 inside exhaust pipe 30 with a small number of components.

After the exhaust adapter is fitted on both exhaust tube 20 and exhaust pipe 30 as described above, a water draining through hole 30a may be provided in exhaust pipe 30 at any position higher than the position where outer peripheral surface 1b of exhaust adapter 1 presses the inner peripheral surface of exhaust pipe 30. Thus, the rain water or the like entered exhaust pipe 30 can be discharged from the inside of exhaust pipe 30 to the outside thereof through water draining through hole 30a, preventing the rain water or like from entering exhaust tube 20.

Although exhaust adapter 1 illustrated in FIGS. 5 to 13 and FIGS. 15 to 24 is configured to include the first to third annular member 2 to 4, exhaust adapter 1 may be formed into a single unit from one kind of material as illustrated in FIGS. 1 to 3.

Second Embodiment

Figure 27:
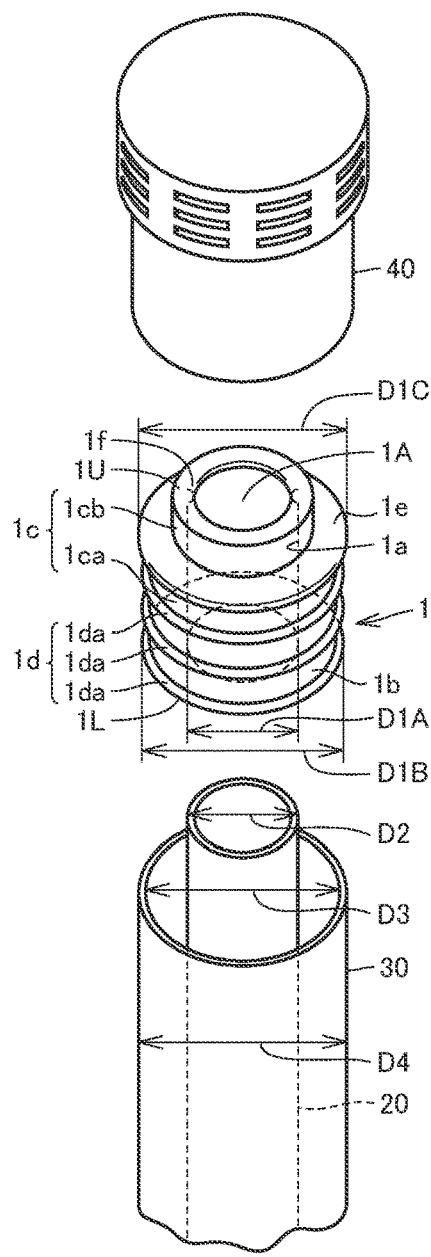
FIG. 27 is an exploded perspective view schematically illustrating an exhaust adapter, an exhaust tube, an exhaust pipe and an exhaust terminal according to a second embodiment of the present invention.
Figure 28:
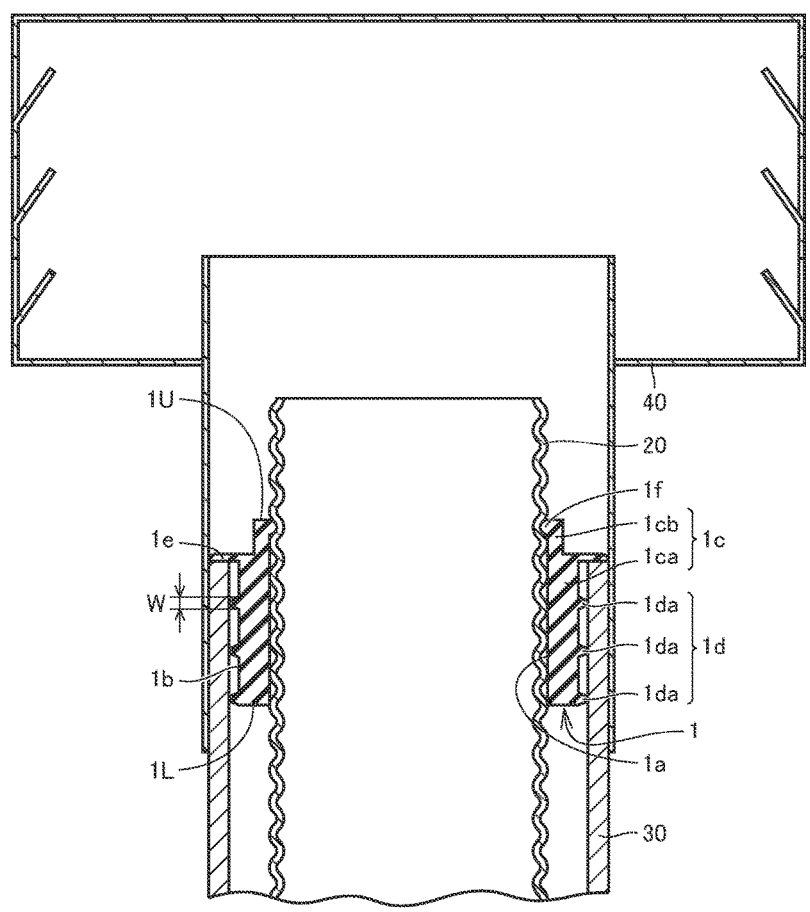
FIG. 28 is a cross sectional view schematically illustrating an assembled configuration of the exhaust adapter, the exhaust tube, the exhaust pipe and the exhaust terminal illustrated in FIG. 27.

With reference to FIGS. 27 and 28, exhaust adapter 1 of the present embodiment is formed to have an annular shape enclosing through hole 1A, and is configured to be supported by exhaust pipe 30 at the outer peripheral side of the annular shape and to support exhaust tube 20 at the inner peripheral side. Exhaust adapter 1 includes an annular member 1c, an annular outer peripheral projection member 1d, an abutting projection member 1e and an annular inner peripheral projection member 1f.

Annular member 1c includes one end surface 1U and the other end surface 1L facing each other and includes through hole 1A penetrating across one end surface 1U and the other end surface 1L. Annular member 1c includes a main part 1ca and an extension part 1cb. Main part 1ca and extension part 1cb each are formed to have an annular shape and the two are joined to each other. The end surface opposite to the portion where extension part 1cb is jointed to main part 1ca serves as one end surface 1U of annular member 1c, and the end surface opposite to the portion where main part 1ca is joined to extension part 1cb serves as the other end surface 1L.

Each of main part 1ca and extension part 1cb has an inner diameter equal to each other. Therefore, the inner peripheral surface of the through hole in main part 1ca and the inner peripheral surface of the through hole in extension part 1cb constitutes a continuous surface when main part 1ca and extension part 1cb are joined together. Through hole 1A is formed by the through hole in main part 1ca and the through hole in extension part 1cb. Main part 1ca has an outer diameter greater than that of extension part 1cb.

Annular outer peripheral projection member 1d projects all around from outer peripheral surface 1b of annular member 1c (main part 1ca) outward circumferentially. Outer peripheral projection member 1d may include, for example, a plurality of annular projections 1da projecting from outer peripheral surface 1b of annular member 1c (main part 1ca) outward circumferentially. In the present embodiment, outer peripheral projection member 1d is composed of, for example, three projections 1da. Outer peripheral projection member 1d (each of the plurality of projections 1da) is configured to have a width W (FIG. 28) decreasing as it extends toward an outer peripheral end thereof. The outer peripheral end of outer peripheral projection member 1d (each of the plurality of projections 1da) may be sharp or blunt without being sharpened.

Abutting projection member 1e projects all around from outer peripheral surface 1b of annular member 1c (main part 1ca) outward circumferentially. Abutting projection member 1e is disposed closer to one end surface 1U of annular member 1c (main part 1ca) than outer peripheral projection member 1d, and projects outward circumferentially from annular member 1c (main part 1ca) greater than outer peripheral projection member 1d. In other words, abutting projection member 1e has a dimension D1C in the radial direction substantially equal to outer diameter D4 of exhaust pipe 30 but greater than both outer diameter D1B of outer peripheral projection member 1d and inner diameter D3 of exhaust pipe 30. Thus, as illustrated in FIG. 28, upon disposing the exhaust adapter between exhaust tube 20 and exhaust pipe 30, abutting projection member 1e can abut against the upper end of exhaust pipe 30. Abutting projection member 1e is formed to have an annular shape, for example.

Annular inner peripheral projection member 1f is provided to project all around from the inner peripheral surface of annular member 1c inward circumferentially. As illustrated by the cross section (taken across one end surface 1U and the other end surface 1L) in FIG. 28, inner peripheral projection member 1f is formed to have an arc shape in profile, for example. Inner peripheral projection member 1f is disposed, for example, at the edge portion on the side of one end surface 1U of annular member 1c (extension part 1cb).

Exhaust adapter 1 is made of an elastic material. The elastic material, for example, is preferably a soft resin, or preferably EPDM (Ethylene-Propylene-Diene Monomer), soft PVC (polyvinyl chloride), Gore-Tex (registered trademark), SOFLEX (registered trademark), silicone rubber, fluorine rubber, chloroprene rubber (CR) or halogenated butyl rubber (IIR).

Exhaust adapter 1 may be made of one kind of elastic material or multiple kinds of elastic materials different from each other.

As illustrated in FIG. 28, annular member 1c of exhaust adapter 1 is configured to be fitted on the outer periphery of exhaust tube 20 so that inner peripheral surface 1a of annular member 1c presses the outer peripheral surface of exhaust tube 20. Specifically, before annular member 1c is fitted on the outer periphery of exhaust tube 20, inner diameter D1A of annular member 1c is sized not greater than outer diameter D2 of exhaust tube 20. As described above, inner peripheral surface 1a of annular member 1c is made of an elastic material.

Thus, while inner peripheral surface 1a of exhaust adapter 1 is being elastically deformed so as to enlarge inner diameter D1A of annular member 1c, exhaust adapter 1 can be fitted on the outer periphery of exhaust tube 20, and after that, inner peripheral surface 1a of annular member 1c will restore its original shape. While annular member 1c is being fitted on the outer periphery of exhaust tube 20, the restoration feature of inner peripheral surface 1a of annular member 1c allows inner peripheral surface 1a of annular member 1c to press the outer peripheral surface of exhaust tube 20.

As illustrated in FIG. 28, exhaust adapter 1 is configured to be fitted into exhaust pipe 30 so that outer peripheral projection member 1d (for example, each of the three projections 1da) of exhaust adapter 1 presses the inner peripheral surface of exhaust pipe 30. Specifically, before exhaust adapter 1 is fitted into exhaust pipe 30, outer diameter D1B of outer peripheral projection member 1d (for example, each of the three projections 1da) of exhaust adapter 1 is sized not smaller than inner diameter D3 of exhaust pipe 30. As described above, outer peripheral projection member 1d (for example, each of the three projections 1da) of exhaust adapter 1 is made of an elastic material.

Thus, while outer peripheral projection member 1d (for example, each of the three projections 1da) of exhaust adapter 1 is being elastically deformed so as to shrink outer diameter D1B of exhaust adapter 1, exhaust adapter 1 is inserted into exhaust pipe 30, and after that, outer peripheral projection member 1d (for example, each of the three projections 1da) of exhaust adapter 1 will restore its original shape. While exhaust adapter 1 is being fitted into exhaust pipe 30, the restoration feature of outer peripheral projection member 1d (for example, each of the three projections 1da) of exhaust adapter 1 allows outer peripheral surface 1b of exhaust adapter 1 to press the inner peripheral surface of exhaust pipe 30.

As illustrated in FIG. 28, while exhaust adapter 1 is being fitted on the outer periphery of exhaust tube 20, it is preferable that inner peripheral projection member 1f fits into the recess disposed on the outer peripheral surface of exhaust tube 20. Specifically, in the case where the outer peripheral surface of exhaust tube 20 is formed into an accordion shape, it is preferable that inner peripheral projection member 1f fits into the recess of the accordion shape. Thereby, exhaust adapter 1 can be fixed firmly by exhaust tube 20.

The upper end of exhaust pipe 30 is mounted with exhaust terminal 40.

Similar to the exhaust structure for water heater according to the first embodiment illustrated in FIG. 2, the exhaust structure for water heater according to the present embodiment is configured to discharge the exhaust gas generated from combustion in water heater 50 to the outdoor side through roof 110 of residential house 100, for example.

Hereinafter, a method for installing exhaust adapter 1 according to the present embodiment will be described with reference to FIGS. 28 to 31.

With reference to FIG. 29, upon mounting the exhaust adapter according to the present embodiment, firstly, exhaust terminal 40 mounted on exhaust pipe 30 is removed therefrom.

Figure 30:
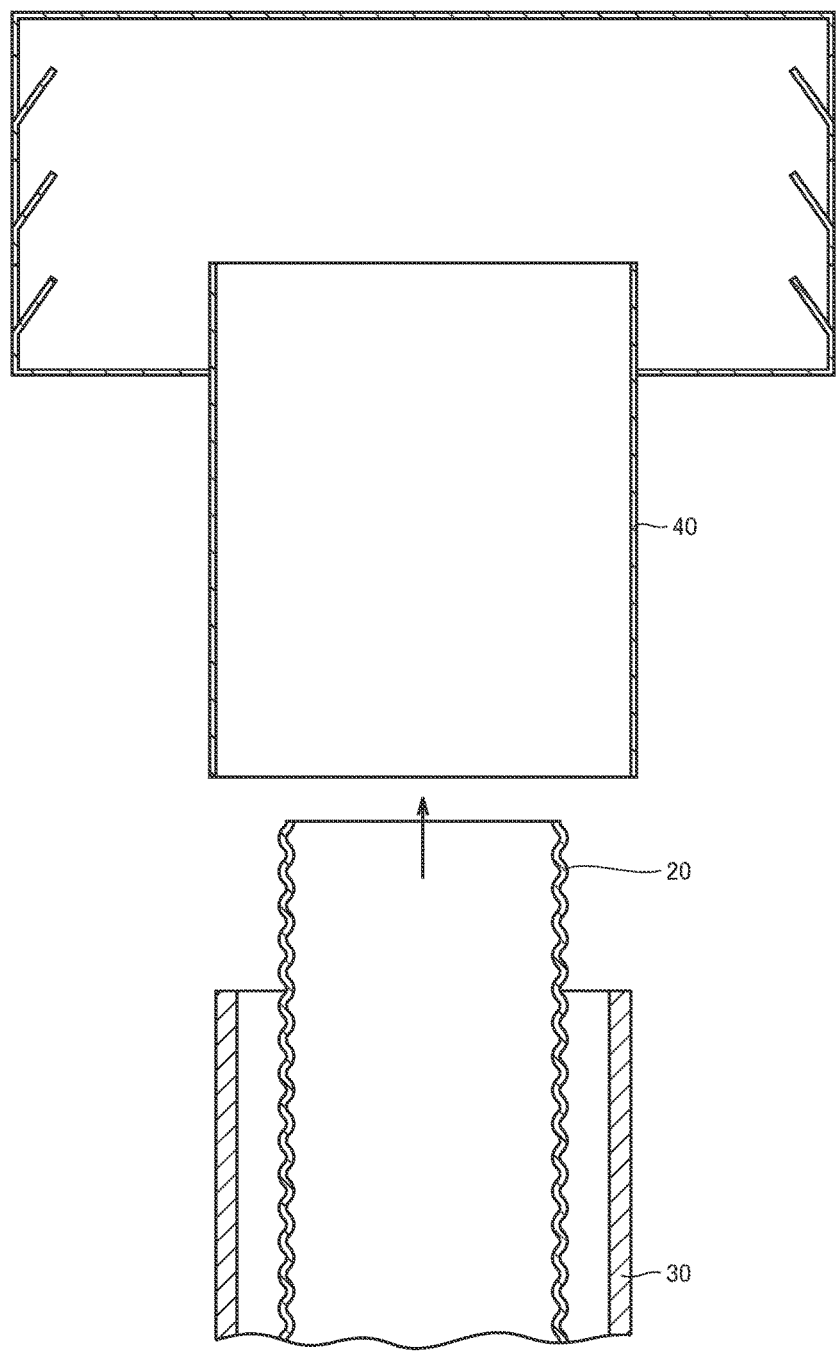
FIG. 30 is a cross sectional view illustrating a second step of a method for installing exhaust adapter for installing the exhaust adapter illustrated in FIG. 27.

With reference to FIG. 30, after exhaust terminal 40 is removed from exhaust pipe 30, exhaust tube 20 is inserted into exhaust pipe 30 from the lower side of exhaust pipe 30, and pulled out of exhaust pipe 30 until an edge portion of exhaust tube 20 protrudes from the upper end of exhaust pipe 30.

Figure 31:
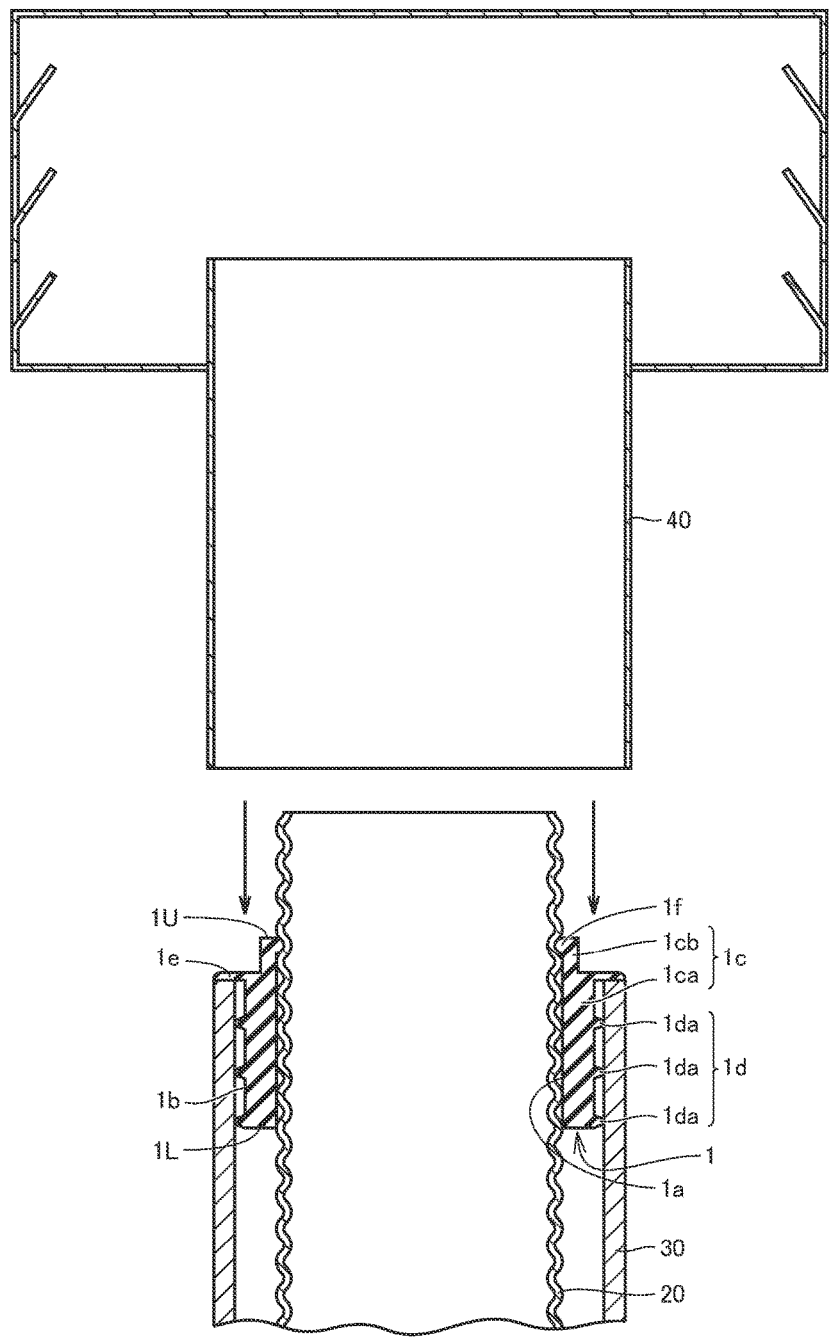
FIG. 31 is a cross sectional view illustrating a third step of a method for installing exhaust adapter for installing the exhaust adapter illustrated in FIG. 27.

With reference to FIG. 31, after an edge portion of exhaust tube 20 has been pulled protruding from the upper end of exhaust pipe 30, exhaust adapter 1 is fitted on the outer peripheral surface of the edge portion of exhaust tube 20 and on the inner peripheral surface of exhaust pipe 30. In this case, as described above, exhaust adapter 1 is fitted on both the outer peripheral surface of exhaust tube 20 and on the inner peripheral surface of exhaust pipe 30 so that inner peripheral surface 1a of annular member 1c presses the outer peripheral surface of exhaust tube 20 and outer peripheral projection member 1d (for example, each of the three projections 1da) presses the inner peripheral surface of exhaust pipe 30.

Upon fitting exhaust adapter 1 into exhaust pipe 30, main part 1ca of annular member 1c is inserted into exhaust pipe 30 until abutting projection member 1e abuts against the upper end of exhaust pipe 30. Similarly, exhaust adapter 1 is fitted on the outer peripheral surface of exhaust pipe 20 so that inner peripheral projection members if fit into the recesses disposed on the outer peripheral surface of exhaust tube 20.

With reference to FIG. 28, after exhaust adapter 1 has been fitted on both exhaust tube 20 and exhaust pipe 30, exhaust terminal 40 is mounted on exhaust pipe 30, and the installation of the exhaust adapter is completed.

Hereinafter, the effects of the present embodiment will be described.

With reference to FIGS. 27 and 28, as described above, exhaust adapter 1 is configured to fix exhaust tube 20 relative to exhaust pipe 30, and is fitted on the outer peripheral surface of exhaust tube 20 as well as on the inner peripheral surface of exhaust pipe 30. While exhaust adapter 1 is being fitted on the outer peripheral surface of exhaust tube 20, the inner peripheral surface of exhaust adapter 1 presses the outer peripheral surface of exhaust tube 20, and while exhaust adapter 1 is being fitted on the inner peripheral surface of exhaust pipe 30, outer peripheral projection member 1d (for example, each of the three projections 1da) of exhaust adapter 1 presses the inner peripheral surface of exhaust pipe 30.

Thereby, exhaust tube 20 can be fixed firmly relative to exhaust pipe 30 by exhaust adapter 1, and the exhaust gas can be prevented from leaking into the space between exhaust tube 20 and exhaust pipe 30, and thereby preventing it from flowing back to the indoor side by exhaust adapter 1. Furthermore, the rain water or the like entered exhaust pipe 30 can be prevented from entering the indoor side through the space between exhaust tube 20 and exhaust pipe 30 by exhaust adapter 1.

According to the present embodiment, as illustrated in FIGS. 27 and 28, while inner peripheral surface 1a of exhaust adapter 1 is being elastically deformed so as to enlarge inner diameter D1A of exhaust adapter 1, exhaust adapter 1 can be fitted on the outer periphery of exhaust tube 20. After that, due to the restoration feature of inner peripheral surface 1a of exhaust adapter 1, inner peripheral surface 1a of exhaust adapter 1 presses the outer peripheral surface of exhaust tube 20. While outer peripheral surface 1b of exhaust adapter 1 is being elastically deformed so as to shrink outer diameter D1B of outer peripheral projection member 1d (for example, each of the three projections 1da) of exhaust adapter 1, exhaust adapter 1 can be inserted into exhaust pipe 30. After that, due to the restoration feature of outer peripheral projection member 1d (for example, each of the three projections 1da) of exhaust adapter 1, outer peripheral projection member 1d (for example, each of the three projections 1da) of exhaust adapter 1 presses the inner peripheral surface of exhaust pipe 30.

Thereby, it is possible to fit exhaust adapter 1 on the outer peripheral surface of exhaust tube 20 so that inner peripheral surface 1a of exhaust adapter 1 presses the outer peripheral surface of exhaust tube 20 and fit exhaust adapter 1 on the inner peripheral surface of exhaust pipe 30 so that outer peripheral projection member 1d (for example, each of the three projections 1da) of exhaust adapter 1 presses the inner peripheral surface of exhaust pipe 30. Thus, it is possible to fix a replacement exhaust tube 20 relative to an existing exhaust pipe 30, allowing the replacement of the water heater to be performed easily and cheaply without involving changes on the appearance of a residential house.

Exhaust adapter 1 is provided with annular inner peripheral projection member if projecting from the inner peripheral surface of annular member 1c inward circumferentially. By fitting inner peripheral projection if into a recess provided on the outer peripheral surface of exhaust tube 20, it is possible to fix exhaust adapter 1 firmly on the outer peripheral surface of exhaust tube 20.

As illustrated in FIG. 28, in the case where inner peripheral projection member if is disposed at any position distant from the edge portion on the side of one end surface 1U toward the other end surface 1L, the water or the like may accumulate in a space formed between the edge portion on the side of one end surface 1U and inner peripheral projection member 1f. However, according to the present embodiment, since inner peripheral projection member if is disposed at the edge portion on the side of one end surface 1U, such space is prevented from being formed therebetween, and consequently, the water or the like is prevented from being accumulated in the space.

Outer peripheral projection member 1d (for example, each of the three projections 1da) is configured to have width W (FIG. 28) decreasing as it extends toward the outer peripheral end thereof. Thus, upon inserting exhaust adapter 1 into exhaust pipe 30, it is possible to reduce the resistance between outer peripheral projection member 1d (for example, each of the three projections 1da) and the inner peripheral surface of exhaust pipe 30, allowing a smooth insertion of exhaust adapter 1 into exhaust pipe 30.

Abutting projection member 1e is disposed on the outer peripheral surface of annular member 1c closer to one end surface 1U than outer peripheral projection member 1d (for example, each of the three projections 1da), and projects outward circumferentially from annular member 1c greater than outer peripheral projection member 1d (for example, each of the three projections 1da). Thus, upon fitting exhaust adapter 1 into exhaust tube 20 and exhaust pipe 30 as illustrated in FIG. 28, abutting projection member 1e abuts against the upper end of exhaust pipe 30, allowing exhaust adapter 1 to be positioned at the upper end of exhaust pipe 30. Even after the assembly, abutting projection member 1e can hold exhaust adapter 1 in exhaust pipe 30 without falling out and protect the upper end surface of exhaust pipe 30 as well.

Figure 32:
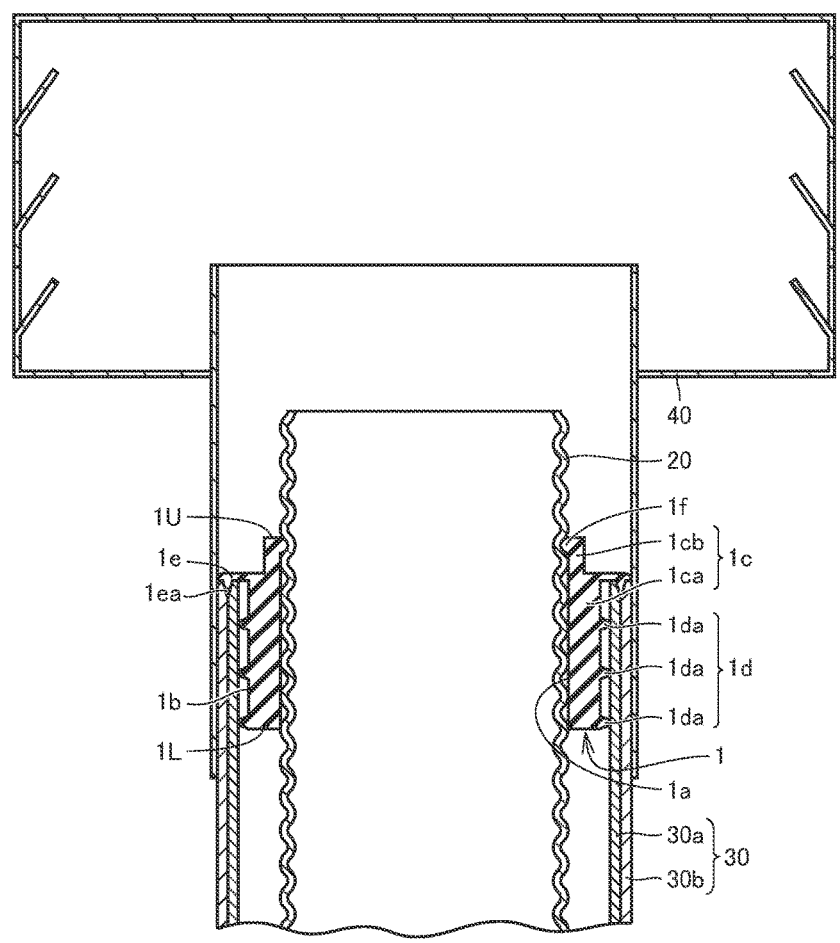
FIG. 32 is a cross sectional view illustrating the configuration of the exhaust adapter illustrated in FIG. 27 in which a dropping member is provided, projecting from an abutting projection member downward.

As illustrated in FIG. 32, an annular dropping member 1ea may be provided on the lower surface of abutting projection member 1e, extending downward (toward the other end surface 1L). In the case where exhaust pipe 30 is made by combining for example two pipes of an inner pipe 30a and an outer pipe 30b, a void may occur between the two pipes of inner pipe 30a and outer pipe 30b at an upper edge portion on the side of exhaust pipe 30. Filling the void with dropping member 1ea described above not only can prevent water or the like from entering the space between the two pipes of inner pipe 30a and outer pipe 30b but also can fix exhaust adapter 1 more firmly on exhaust pipe 30.

Figure 33:
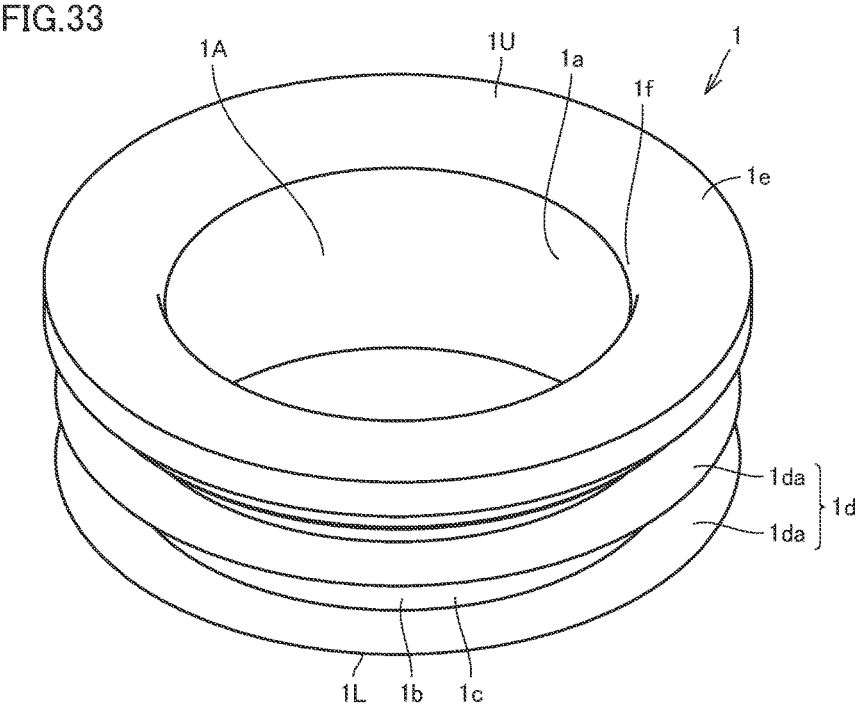
FIG. 33 is a perspective view schematically illustrating another configuration of the exhaust adapter according to the second embodiment of the present invention.
Figure 34:
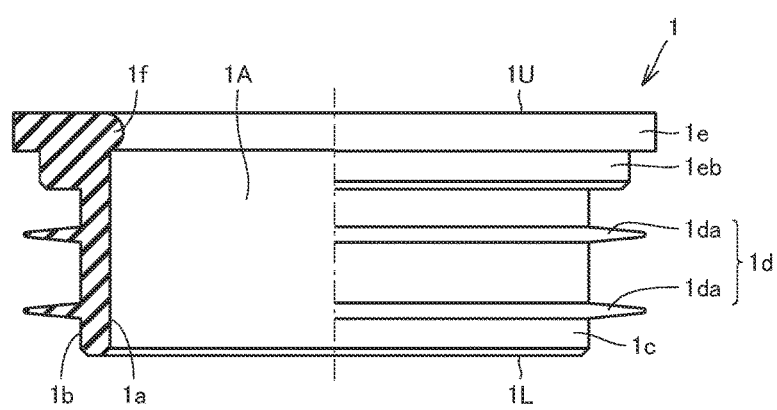
FIG. 34 is a side and cross sectional view schematically illustrating another configuration of the exhaust adapter according to the second embodiment of the present invention.

As illustrated in FIGS. 33 and 34, annular member 1c may be configured to include main part 1ca only, without including extension part 1cb. In this configuration, extension part 1cb in the configuration illustrated in FIGS. 28 and 29 is not provided, and the portion where abutting projection member 1e is provided serves as one end surface 1U of annular member 1c. In order to reinforce abutting projection member 1e, an annular reinforcement member 1eb is provided below abutting projection member 1e at the side facing the other end surface 1L.

Reinforcement member 1eb is formed to project all around from outer peripheral surface 1b of annular member 1c outward circumferentially. The outer diameter of reinforcement member 1eb is configured to be smaller than the outer diameter of abutting projection member 1e and the outer diameter of outer peripheral projection member 1d but equal to or smaller than inner diameter D3 (FIG. 27) of exhaust pipe 30.

Inner peripheral projection member if is provided annularly at the edge portion on the side of one end surface 1U. Outer peripheral projection member 1d is composed of, for example, two projections 1da. Outer peripheral projection member 1d (each of the plurality of projections 1da) is provided on the outer peripheral surface of main part 1ca at any position except the edge portion on the side of one end surface 1U and the edge portion on the side of the other end surface 1L.

Except those described above, the other components in the configuration illustrated in FIGS. 33 and 34 are substantially the same as the components of exhaust adapter 1 illustrated in FIGS. 28 and 29, the same component will be assigned with the same reference numeral, and the description thereof will not be repeated.

The same effects can be obtained by the configuration illustrated in FIGS. 33 and 34 as those illustrated in FIGS. 28 and 29.

Figure 35:
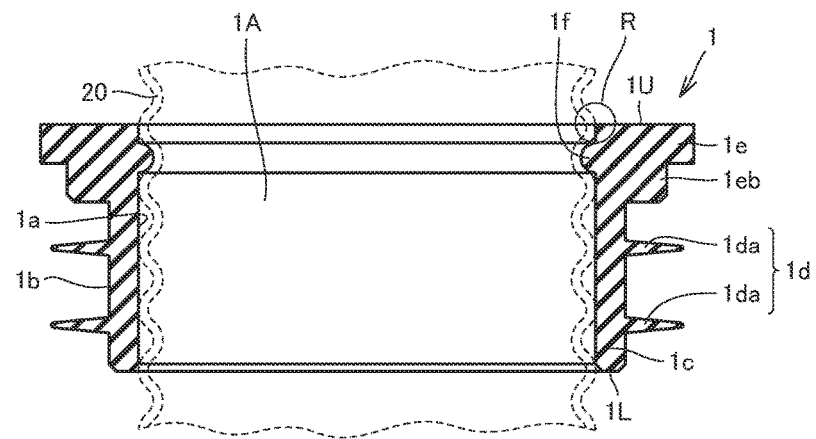
FIG. 35 is a cross sectional view illustrating that an inner peripheral projection member is provided at any position distant from an upper end of the exhaust adapter illustrated in FIGS. 33 and 34.

As illustrated in FIG. 35, inner peripheral projection member if may be disposed at any position distant from the edge portion on the side of one end surface 1U toward the other end surface 1L. However, in such configuration, the water or the like may accumulate in a regional space R formed between the edge portion on the side of one end surface 1U and inner peripheral projection member 1f. In order to prevent the water accumulation, as illustrated in FIGS. 33 and 34, it is preferable that inner projection member if is disposed at the edge portion on the side of one end surface 1U.

Figure 36:
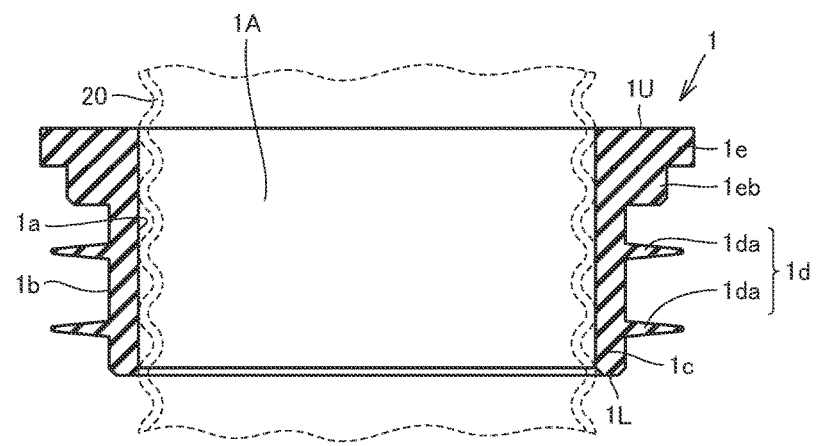
FIG. 36 is a cross sectional view illustrating that an inner peripheral projection member is not provided in the exhaust adapter illustrated in FIGS. 33 and 34.

As illustrated in FIG. 36, inner peripheral projection member if may not be provided in the configuration illustrated in FIGS. 33 and 34. In this case, the inner diameter of inner peripheral surface 1a of annular member 1c remains constant from one end surface 1U to the other end surface 1L.

Figure 37:
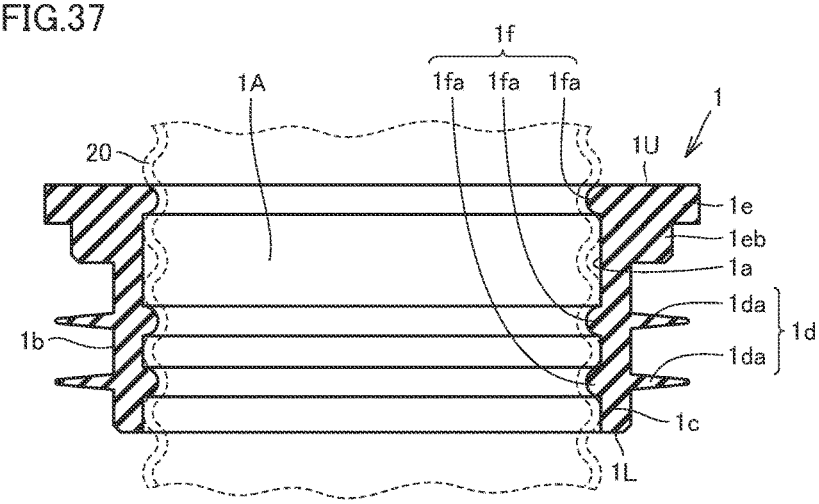
FIG. 37 is a cross sectional view illustrating that a plurality of inner peripheral projection members are provided in the exhaust adapter illustrated in FIGS. 33 and 34.

As illustrated in FIG. 37, inner peripheral projection member if may be provided to include a plurality of projections 1fa each projecting all around from the inner peripheral surface of annular member 1c inward circumferentially. Thus, the plurality of projections 1fa can fit into a plurality of recesses provided on the outer peripheral surface of exhaust tube 20, and thereby, exhaust adapter 1 can be supported more firmly on exhaust tube 20.

Figure 38:
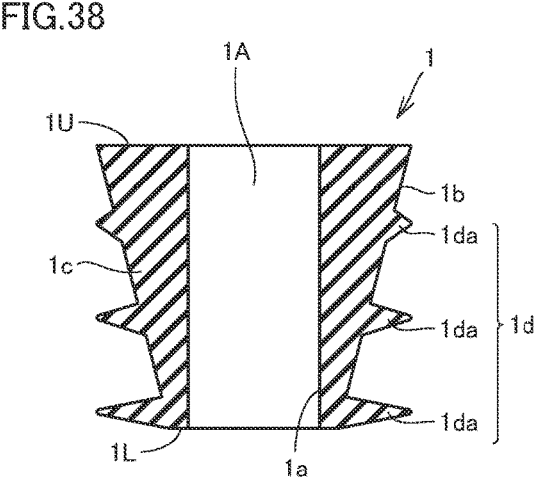
FIG. 38 is a cross sectional view illustrating that the cross section of an annular member in the exhaust adapter has a tapered shape.

As illustrated in FIG. 38, annular member 1c of exhaust adapter 1 may be formed to have a tapered shape with the outer diameter decreasing from one end surface 1U toward the other end surface 1L. In FIG. 38, the shape of exhaust adapter 1 is simplified for clarity, and main part 1ca illustrated in FIGS. 28 and 29, main part 1ca illustrated in FIG. 32 and annular member 1c illustrated in FIGS. 33 and 34 each may be formed to have the tapered shape illustrated in FIG. 38. The bulk compressibility of projections 1da located at the side of one end surface 1U may be configured higher than that of projections 1da located at the side of the other end surface 1L.

By forming main part 1ca or annular member 1c into the tapered shape described above, it is possible to insert exhaust adapter 1 into exhaust pipe 30 easily from the side of the other end surface 1L.

Third Embodiment

Figure 39:
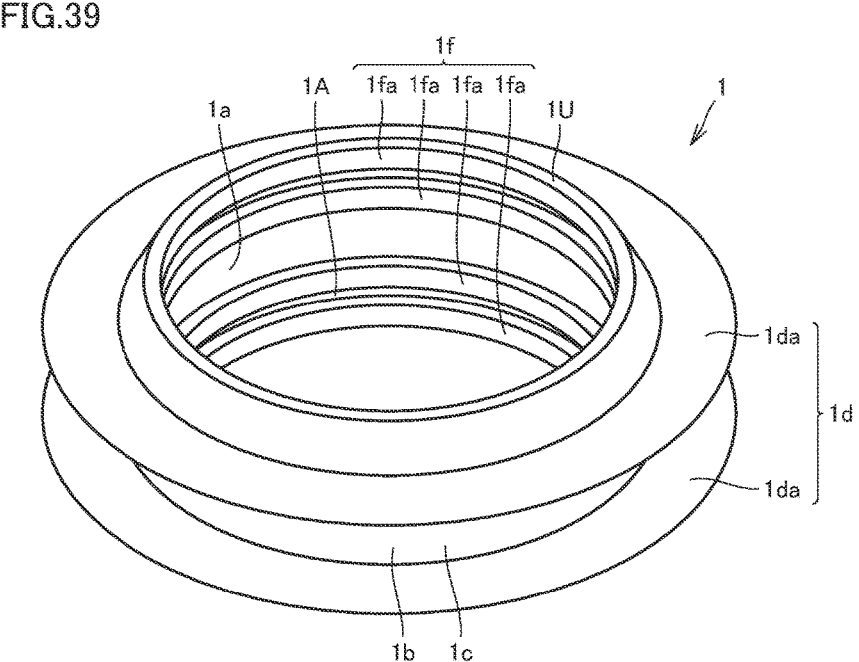
FIG. 39 is a perspective view schematically illustrating an exhaust adapter according to a third embodiment of the present invention.
Figure 40:
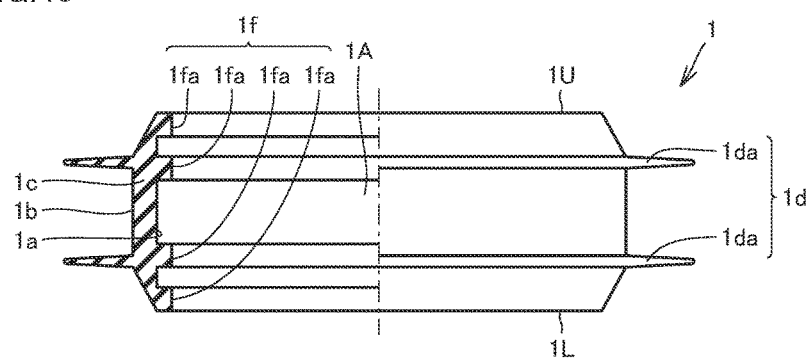
FIG. 40 is a side and cross sectional view schematically illustrating another configuration of the exhaust adapter according to the third embodiment of the present invention.

With reference to FIGS. 39 and 40, exhaust adapter 1 of the present embodiment includes annular member 1c, annular outer peripheral projection member 1d and annular inner peripheral projection member 1f.

Annular member 1c includes one end surface 1U and the other end surface 1L facing each other and includes through hole 1A penetrating across one end surface 1U and the other end surface 1L. Annular outer peripheral projection member 1d projects all around from outer peripheral surface 1b of annular member 1c outward circumferentially. Outer peripheral projection member 1d may include a plurality of annular projections 1da projecting from outer peripheral surface 1b of annular member 1c outward circumferentially. In the present embodiment, outer peripheral projection member 1d is composed of, for example, two projections 1da.

Outer peripheral projection member 1d (each of the plurality of projections 1da) is configured to have a width decreasing as it extends toward an outer peripheral end thereof. The outer peripheral end of outer peripheral projection member 1d (each of the plurality of projections 1da) may be sharp or blunt without being sharpened.

Outer peripheral projection member 1d (each of the plurality of projections 1da) is provided on the outer peripheral surface of annular member 1c at any position except an edge portion on the side of one end surface 1U and an edge portion on the side of the other end surface 1L.

Annular inner peripheral projection member if is provided to project all around from the inner peripheral surface of annular member 1c inward circumferentially. As illustrated by the cross section (taken across one end surface 1U and the other end surface 1L) in FIG. 40, inner peripheral projection member 1f is formed to have a rectangular shape in profile, for example. However, it is acceptable that inner peripheral projection member if is formed to have an arc shape or a trapezoidal shape in profile, for example.

Inner peripheral projection member if may include may include a plurality of annular projections 1fa projecting from inner peripheral surface 1a of annular member 1c inward circumferentially. In the present embodiment, inner peripheral projection member if is composed of, for example, four projections 1fa. Among the four projections, one projection 1fa is disposed at the edge portion on the side of one end surface 1U of annular member 1c. Another projection 1fa among the four projections is disposed at the edge portion on the side of the other end surface 1L of annular member 1c. The remaining two projections 1fa is disposed between the edge portion on the side of one end surface 1U and the edge portion on the side of the other end surface 1L of annular member 1c.

Except those described above, the other components in the exhaust adapter according to the present embodiment are substantially the same as the components of exhaust adapter 1 illustrated in FIGS. 27 and 28 according to the second embodiment, the same component will be assigned with the same reference numeral, and the description thereof will not be repeated.

Hereinafter, a method for installing exhaust adapter 1 according to the present embodiment will be described with reference to FIGS. 41 and 42.

Figure 41:
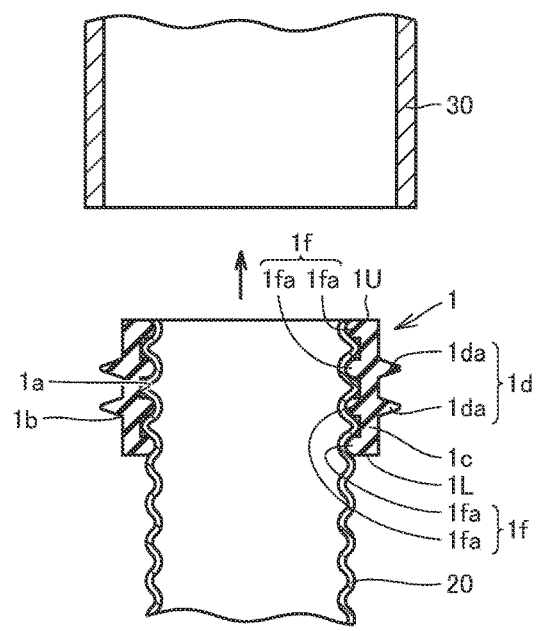
FIG. 41 is a cross sectional view illustrating a first step of a method for installing exhaust adapter for installing the exhaust adapter illustrated in FIG. 39.

With reference to FIG. 41, upon mounting the exhaust adapter according to the present embodiment, firstly, exhaust adapter 1 is fitted on an edge portion of exhaust tube 20. Thereby, exhaust adapter 1 is fitted on the outer peripheral surface of exhaust tube 20 so that inner peripheral surface 1a of annular member 1c presses the outer peripheral surface of exhaust tube 20. Meanwhile, inner peripheral projection member 1f (for example, each of the four projections 1fa) fits into the recess provided on the outer peripheral surface of exhaust tube 20.

Figure 42:
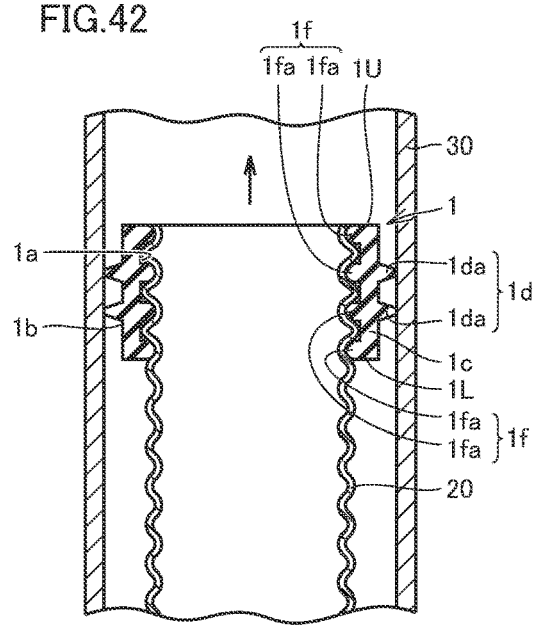
FIG. 42 is a cross sectional view illustrating a second step of a method for installing exhaust adapter for installing the exhaust adapter illustrated in FIG. 39.

With reference to FIG. 42, after exhaust adapter 1 has been mounted on the edge portion of exhaust tube 20, both exhaust adapter 1 and the edge portion of exhaust tube 20 are inserted as a whole into exhaust pipe 30 from the lower side of exhaust pipe 30. During the insertion, outer peripheral projection member 1d (each of the plurality of projections 1da) is pushed to move inside exhaust pipe 30 while pressing the entire inner peripheral surface of exhaust pipe 30.

The insertion of exhaust adapter 1 and exhaust tube 20 into exhaust pipe 30 is finished after exhaust adapter 1 reaches a position having a desired height in exhaust pipe 30, and the installation of the exhaust adapter is completed. According to this method for installing, the installer can install the exhaust adapter without the need of climbing up to roof 110 (FIG. 2).

Hereinafter, the effects of the present embodiment will be described.

With reference to FIG. 42, as described above, exhaust adapter 1 is configured to fix exhaust tube 20 relative to exhaust pipe 30, and is fitted on the outer peripheral surface of exhaust tube 20 as well as on the inner peripheral surface of exhaust pipe 30. While exhaust adapter 1 is being fitted on the outer peripheral surface of exhaust tube 20, the inner peripheral surface of exhaust adapter 1 presses the outer peripheral surface of exhaust tube 20, and while exhaust adapter 1 is being fitted on the inner peripheral surface of exhaust pipe 30, outer peripheral projection member 1d (for example, each of the two projections 1da) of exhaust adapter 1 presses the inner peripheral surface of exhaust pipe 30.

Thereby, exhaust tube 20 can be firmly fixed relative to exhaust pipe 30 by exhaust adapter 1, and the exhaust gas can be prevented from leaking into the space between exhaust tube 20 and exhaust pipe 30, and thereby preventing it from flowing back to the indoor side by exhaust adapter 1. Furthermore, the rain water or the like entered exhaust pipe 30 can be prevented from entering the indoor side through the space between exhaust tube 20 and exhaust pipe 30 by exhaust adapter 1.

According to the present embodiment, as illustrated in FIG. 42, while outer peripheral surface 1b of exhaust adapter 1 is being elastically deformed so as to shrink outer diameter D1B of outer peripheral projection member 1d (for example, each of the two projections 1da) of exhaust adapter 1, exhaust adapter 1 can be inserted into exhaust pipe 30. After that, due to the restoration feature of outer peripheral projection member 1d (for example, each of the two projections 1da) of exhaust adapter 1, outer peripheral projection member 1d (for example, each of the two projections 1da) of exhaust adapter 1 presses the inner peripheral surface of exhaust pipe 30. While inner peripheral surface 1a of exhaust adapter 1 is being elastically deformed so as to enlarge inner diameter D1A of exhaust adapter 1, exhaust adapter 1 can be fitted on the outer periphery of exhaust tube 20. After that, due to the restoration feature of inner peripheral surface 1a of exhaust adapter 1, inner peripheral surface 1a of exhaust adapter 1 presses the outer peripheral surface of exhaust tube 20.

Thereby, it is possible to fit exhaust adapter 1 on the inner peripheral surface of exhaust pipe 30 so that outer peripheral projection member 1d (for example, each of the two projections 1da) of exhaust adapter 1 presses the inner peripheral surface of exhaust pipe 30 and possible to fit exhaust adapter 1 on the outer peripheral surface of exhaust tube 20 so that inner peripheral surface 1a of exhaust adapter 1 presses the outer peripheral surface of exhaust tube 20. Thus, it is possible to fix a replacement exhaust tube 20 relative to an existing exhaust pipe 30, allowing the replacement of the water heater to be performed easily and cheaply without involving changes on the appearance of a residential house.

Outer peripheral projection member 1d includes a plurality of (two, for example) annular projections 1da. Since each of the plurality of (two, for example) projections 1da presses the inner peripheral surface of exhaust pipe 30, it is possible for the exhaust adapter to further prevent the exhaust gas from leaking out from a joint point.

Figure 43:
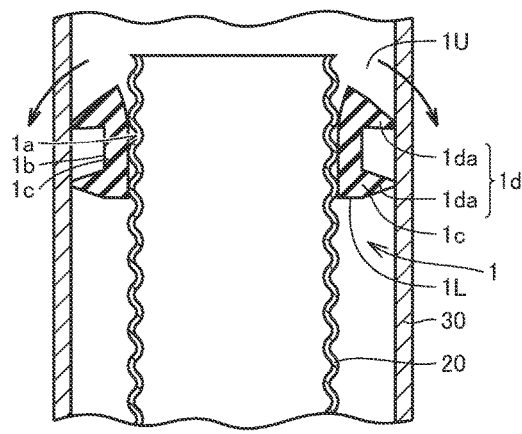
FIG. 43 is a cross sectional view schematically illustrating that an upper end of the annular member of the exhaust adapter is torn away from the exhaust tube.

As illustrated in FIG. 43, in the case where annular member 1c is provided with outer peripheral projection member 1d at an edge portion on the side of one end surface 1U but without inner peripheral projection member 1f, when the exhaust adapter is inserted into exhaust pipe 30 together with exhaust tube 20, the edge portion of annular member 1c on the side of one end surface 1U may be torn away from exhaust tube 20 due to the resistance between outer peripheral projection member 1d and the inner peripheral surface of exhaust pipe 30.

In order to solve this problem, in the present embodiment, outer peripheral projection member 1d (for example, each of the two projections 1da) is provided on outer peripheral surface 1b of annular member 1c at any position except an edge portion on the side of one end surface 1U and an edge portion on the side of the other end surface 1L. Thus, it is possible to make annular member 1c contact the outer peripheral surface of the exhaust tube closer at the edge portion on the side of one end surface 1U than at outer peripheral projection member 1d (for example, each of the two projections 1da). Thereby, when exhaust adapter 1 which has been fitted on the outer peripheral surface of exhaust tube 20 is being inserted into exhaust pipe 30, even though outer peripheral projection member 1d (for example, each of the two projections 1da) scrapes against the inner peripheral surface of exhaust pipe 30, the edge portion on the side of one end surface 1U of exhaust adapter 1 can be prevented from being torn away from exhaust tube 20.

Inner peripheral projection member 1f (projections 1fa) is disposed at an edge portion on the side of one end surface 1U. Thereby, when exhaust adapter 1 which has been fitted on the outer peripheral surface of exhaust tube 20 is being inserted into exhaust pipe 30, even though outer peripheral projection member 1d (for example, each of the two projections 1da) scrapes against the inner peripheral surface of exhaust pipe 30, the edge portion on the side of one end surface 1U of exhaust adapter 1 can be prevented from being bent further away from exhaust tube 20.

In the case where inner peripheral projection member if (projections 1fa) is disposed at a position distant from the edge portion on the side of one end surface 1U toward the other end surface 1L, the water or the like may accumulate in a space formed between the edge portion on the side of one end surface 1U and inner peripheral projection member if (projections 1fa). However, in exhaust adapter 1 according to the present embodiment, since inner peripheral projection member if (projections 1fa) is disposed at an edge portion on the side of one end surface 1U, such space is prevented from being formed therebetween, and consequently, the water or the like is prevented from being accumulated in the space.

Figure 44:
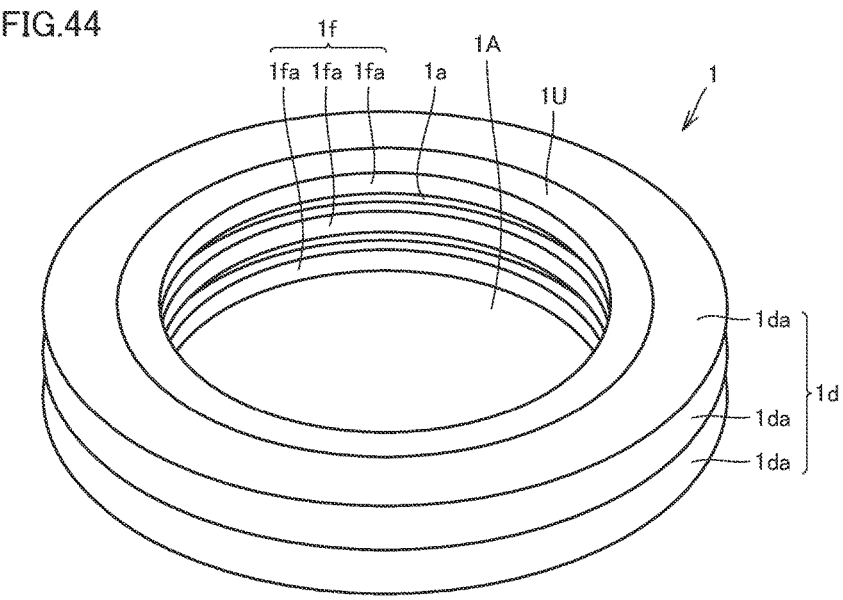
FIG. 44 is a perspective view schematically illustrating another configuration of the exhaust adapter according to the third embodiment of the present invention.
Figure 45:
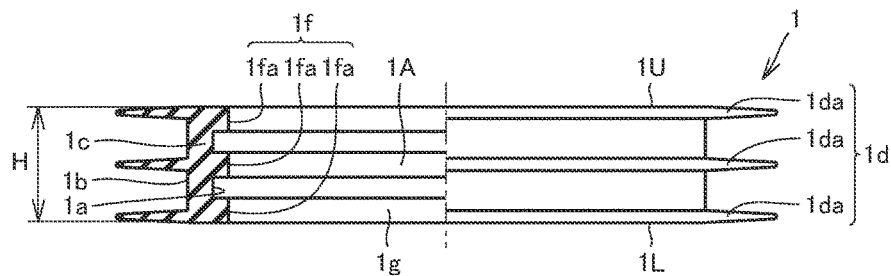
FIG. 45 is a side and cross sectional view schematically illustrating another configuration of the exhaust adapter according to the third embodiment of the present invention.

As illustrated in FIGS. 44 and 45, outer peripheral projection member 1d (projections 1da) may be disposed on annular member 1c at an edge portion on the side of one end surface 1U and an edge portion on the side of the other end surface 1L. Specifically, an extension part extending from outer peripheral projection member 1d (projections 1da) toward one end surface 1U and the other end surface 1L of annular member 1c may not be provided. In this case, since the extension part extending from outer peripheral projection member 1d (projections 1da) toward one end surface 1U and the other end surface 1L of annular member 1c is not provided, the height H of exhaust adapter 1 can be made smaller than those illustrated in FIG. 30 and FIG. 40. Consequently, it is easy to fit exhaust adapter 1 on the outer peripheral surface of exhaust tube 20.

Figure 46:
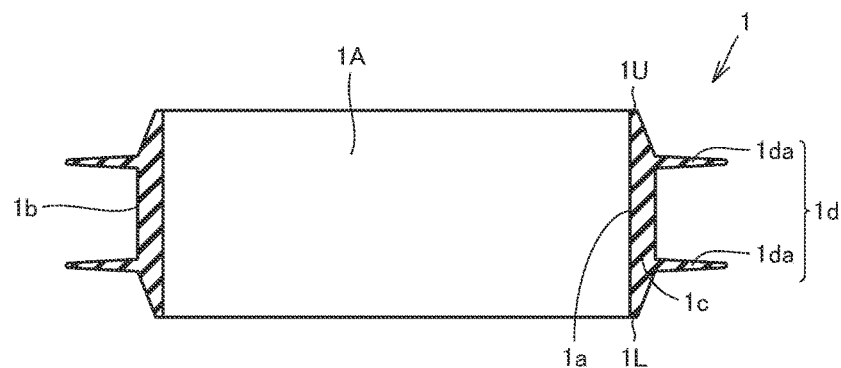
FIG. 46 is a cross sectional view illustrating that an inner peripheral projection member is not provided in the exhaust adapter illustrated in FIGS. 39 and 40.
Figure 47:
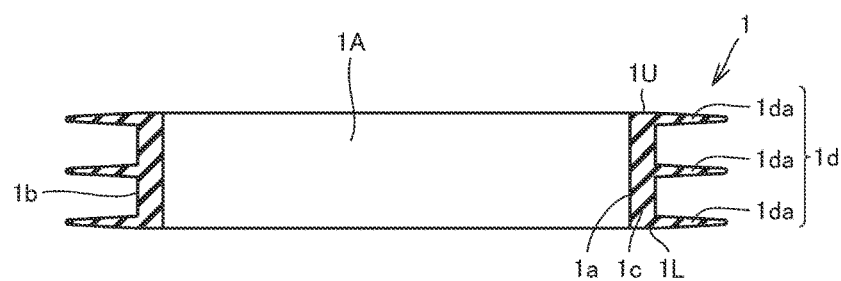
FIG. 47 is a cross sectional view illustrating that an inner peripheral projection member is not provided in the exhaust adapter illustrated in FIGS. 44 and 45.

The number of projections 1da constituting outer peripheral projection member 1d may be three or more or may be one. The number of projections 1fa constituting inner peripheral projection member if may be three, one, or 5 or more. As illustrated in FIGS. 46 and 47, inner peripheral projection member if may be dispensed with. In this case, the inner diameter of annular member 1c remains constant from one end surface 1U to the other end surface 1L.

Except those described above, the other components of the exhaust adapter illustrated in FIGS. 44, 45 and 47 are substantially the same as the components of the exhaust adapter illustrated in FIGS. 39 and 40, the same component will be assigned with the same reference numeral, and the description thereof will not be repeated.

Figure 48:
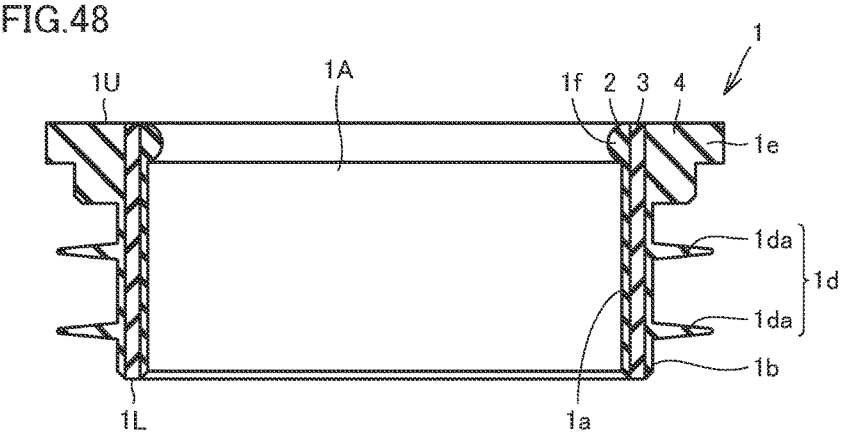
FIG. 48 is a cross sectional view illustrating that the annular member of the exhaust adapter illustrated in FIGS. 33 and 34 is composed of a first annular member to a third annular member.
Figure 49:
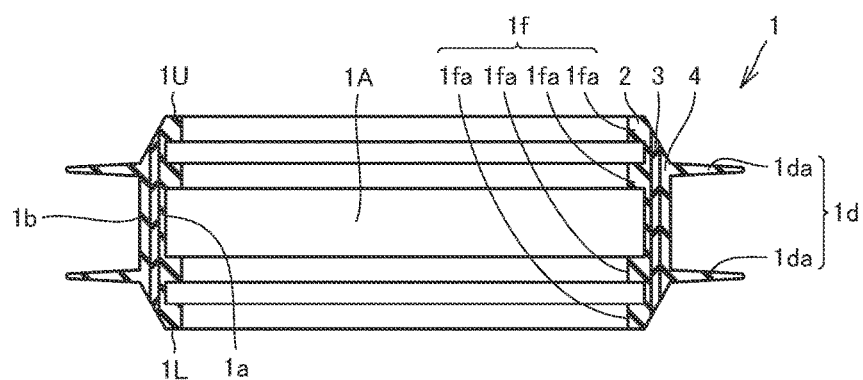
FIG. 49 is a cross sectional view illustrating that the annular member of the exhaust adapter illustrated in FIGS. 39 and 40 is composed of a first annular member to a third annular member.
Figure 50:
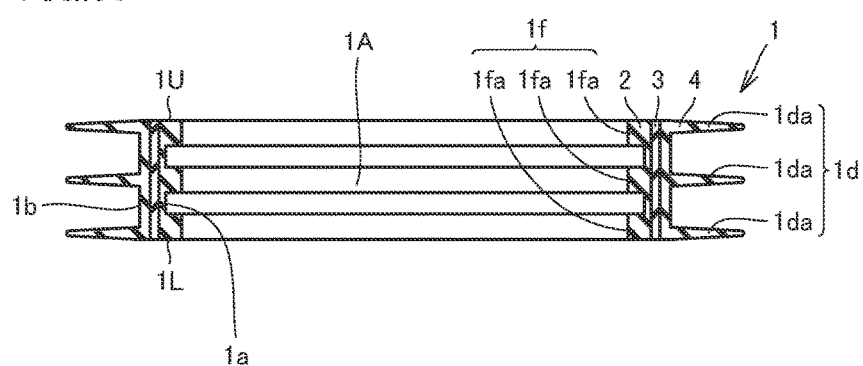
FIG. 50 is a cross sectional view illustrating that the annular member of the exhaust adapter illustrated in FIGS. 44 and 45 is composed of a first annular member to a third annular member.

As illustrated in FIGS. 48, 49 and 50, annular member 1c of exhaust adapter 1 includes first annular member 2 located innermost the annular shape, second annular member 4 located outermost the annular shape, and third annular member 3 located between first annular member 2 and second annular member 4 as described above with reference to FIG. 4. Third annular member 3 has a higher hardness than any of first annular member 2 and second annular member 4.

In this case, inner peripheral projection member if (projections 1fa) is made of the same material as first annular member 2 and has a hardness greater than third annular member 3. Outer peripheral projection member 1d (projections 1da) is made of the same material as second annular member 4 and has a hardness smaller than third annular member 3.

In addition, the material for exhaust tube 20 described above in the first to third embodiments may be selected from any material resistant to acid such as phenol resin, epoxy resin, silicone resin, fluorine resin such as tetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin.

In the case of the exhaust structure for a condensing type water heater, the exhaust terminal and the exhaust pipe disposed above the exhaust adapter may be coated in the field with resin coating having corrosion resistance. The exhaust terminal may be replaced with a exhaust top made of resin having corrosion resistance.

Moreover, exhaust adapter 1 described above in the first to third embodiments can be applied to a water heater of exhaust suction type in which a fan is disposed downstream to the burner and the heat exchanger in the flow of combustion gas generated by the burner, and can also be applied to a water heater of exhaust pushing type in which a fan is disposed upstream to the burner and the heat exchanger in the flow of combustion gas generated by the burner.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An exhaust adapter which is formed to have an annular shape enclosing a through hole and is configured to be supported by an exhaust pipe at an outer peripheral side of said annular shape and to support an exhaust tube at an inner peripheral side thereof, comprising:
   a first annular member having an inner peripheral wall and an outer peripheral wall and located innermost said annular shape;
   a second annular member having an inner peripheral wall and an outer peripheral wall and located outermost said annular shape; and
   a third annular member having an inner peripheral wall and an outer peripheral wall and located between said first annular member and said second annular member and having a hardness higher than any of said first annular member and said second annular member, wherein
   the first annular member, the second annular member, and the third annular member are arranged concentrically and enclose the through hole,
   the exhaust adapter is made of an elastic material,
   the first, third, and second annular members compose a three-layer structure,
   the first annular member is made of a different material from the second annular member, and
   the first, third, and second annular members are arranged concentrically such that the inner peripheral wall of the second annular member is positioned in height and radius outwardly from the inner peripheral wall of the third annular member.

2. An exhaust structure for water heater, comprising:
   a water heater;
   an exhaust tube which has one end and the other end and is connected to said water heater at said one end;
   an exhaust pipe into which a part of said exhaust tube at the other end thereof is inserted; and
   an exhaust adapter which is formed to have an annular shape enclosing a through hole, and is mounted on an outer peripheral surface of said exhaust tube by inserting said exhaust tube into said through hole and is mounted on an inner peripheral surface of said exhaust pipe, when said exhaust adapter being fitted on said outer peripheral surface of said exhaust tube, an inner peripheral surface of said exhaust adapter pressing said outer peripheral surface of said exhaust tube, and when said exhaust adapter being fitted on said inner peripheral surface of said exhaust pipe, an outer peripheral surface of said exhaust adapter pressing said inner peripheral surface of said exhaust pipe, wherein said exhaust adapter includes a first annular member having an inner peripheral wall and an outer peripheral wall and located innermost said annular shape;

a second annular member having an inner peripheral wall and an outer peripheral wall and located outermost said annular shape; and a third annular member having an inner peripheral wall and an outer peripheral wall and located between said first annular member and said second annular member and having a hardness higher than any of said first annular member and said second annular member, the first annular member, the second annular member, and the third annular member are arranged concentrically and enclose the through hole, the exhaust adapter is made of an elastic material, the first, third, and second annular members compose a three-layer structure, the first annular member is made of a different material from the second annular member, and the first, third, and second annular members are arranged concentrically such that the inner peripheral wall of the second annular member is positioned in height and radius radially outward from the inner peripheral wall of the third annular member.

3. The exhaust structure for water heater according to claim 2, wherein said inner peripheral surface of said exhaust adapter includes a portion of an accordion shape.

4. The exhaust structure for water heater according to claim 2, wherein said inner peripheral surface of said exhaust adapter includes a portion of a spiral groove shape.

* * * * *